US011855896B1

(12) United States Patent
Cheung et al.

(10) Patent No.: US 11,855,896 B1
(45) Date of Patent: Dec. 26, 2023

(54) SYSTEMS AND METHODS FOR LOAD BALANCING NETWORK TRAFFIC AT FIREWALLS DEPLOYED IN A CLOUD COMPUTING ENVIRONMENT

(71) Applicant: AVIATRIX SYSTEMS, INC., Santa Clara, CA (US)

(72) Inventors: Lee-Chik Cheung, Santa Clara, CA (US); Xiaobo Sherry Wei, Palo Alto, CA (US); Shanshan Xu, Fremont, CA (US); Praveen Vannarath, Sunnyvale, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 45 days.

(21) Appl. No.: 17/216,601

(22) Filed: Mar. 29, 2021

Related U.S. Application Data

(60) Provisional application No. 63/133,152, filed on Dec. 31, 2020, provisional application No. 63/069,653, filed on Aug. 24, 2020.

(51) Int. Cl.
*H04L 47/125* (2022.01)
*H04L 67/10* (2022.01)
*H04L 12/46* (2006.01)
*H04L 9/40* (2022.01)
*H04L 12/66* (2006.01)

(52) U.S. Cl.
CPC ........ *H04L 47/125* (2013.01); *H04L 12/4641* (2013.01); *H04L 12/66* (2013.01); *H04L 63/0218* (2013.01); *H04L 67/10* (2013.01); *H04L 63/0272* (2013.01)

(58) Field of Classification Search
CPC ... H04L 47/125; H04L 12/4641; H04L 12/66; H04L 63/0218; H04L 67/10; H04L 63/0272
USPC ........................................................ 370/235
See application file for complete search history.

(56) References Cited

U.S. PATENT DOCUMENTS

| 9,385,994 | B2 * | 7/2016 | Ke ..................... H04L 63/0236 |
| 11,140,132 | B1 * | 10/2021 | Samaha .............. H04L 63/0227 |
| 2013/0291088 | A1 * | 10/2013 | Shieh ................. H04L 63/0263 726/11 |
| 2020/0067734 | A1 * | 2/2020 | Hira ....................... H04L 67/10 |
| 2020/0259792 | A1 * | 8/2020 | Devarajan ........... H04L 63/0218 |

(Continued)

*Primary Examiner* — Cheikh T Ndiaye
*Assistant Examiner* — Ayele F Woldemariam
(74) *Attorney, Agent, or Firm* — Winstead PC

(57) ABSTRACT

A computerized method for directing transmission of a data packet within a distributed cloud computing system is disclosed that includes receiving the data packet by a receiving gateway instance deployed within the distributed cloud computing system, when a session corresponding to the data packet is found via a session lookup, forwarding the data packet to a destination in accordance with the session lookup, when the session is not found via the session lookup, determining whether one least one peer firewall instance is available, and when a first peer firewall instance is available and the data packet is a synchronize packet, forwarding the data packet to the first peer firewall instance. In some instances, the data packet is a TCP packet and in others, the data packet is received from either of a spoke gateway or a transit gateway that is deployed within the distributed cloud computing system.

8 Claims, 24 Drawing Sheets

(56) References Cited

U.S. PATENT DOCUMENTS

2021/0218598 A1* 7/2021 Ganapathy .............. H04L 45/64
2021/0314388 A1* 10/2021 Zhou ................... H04L 63/0272
2021/0320817 A1* 10/2021 Janakiraman ....... H04L 12/4641

* cited by examiner

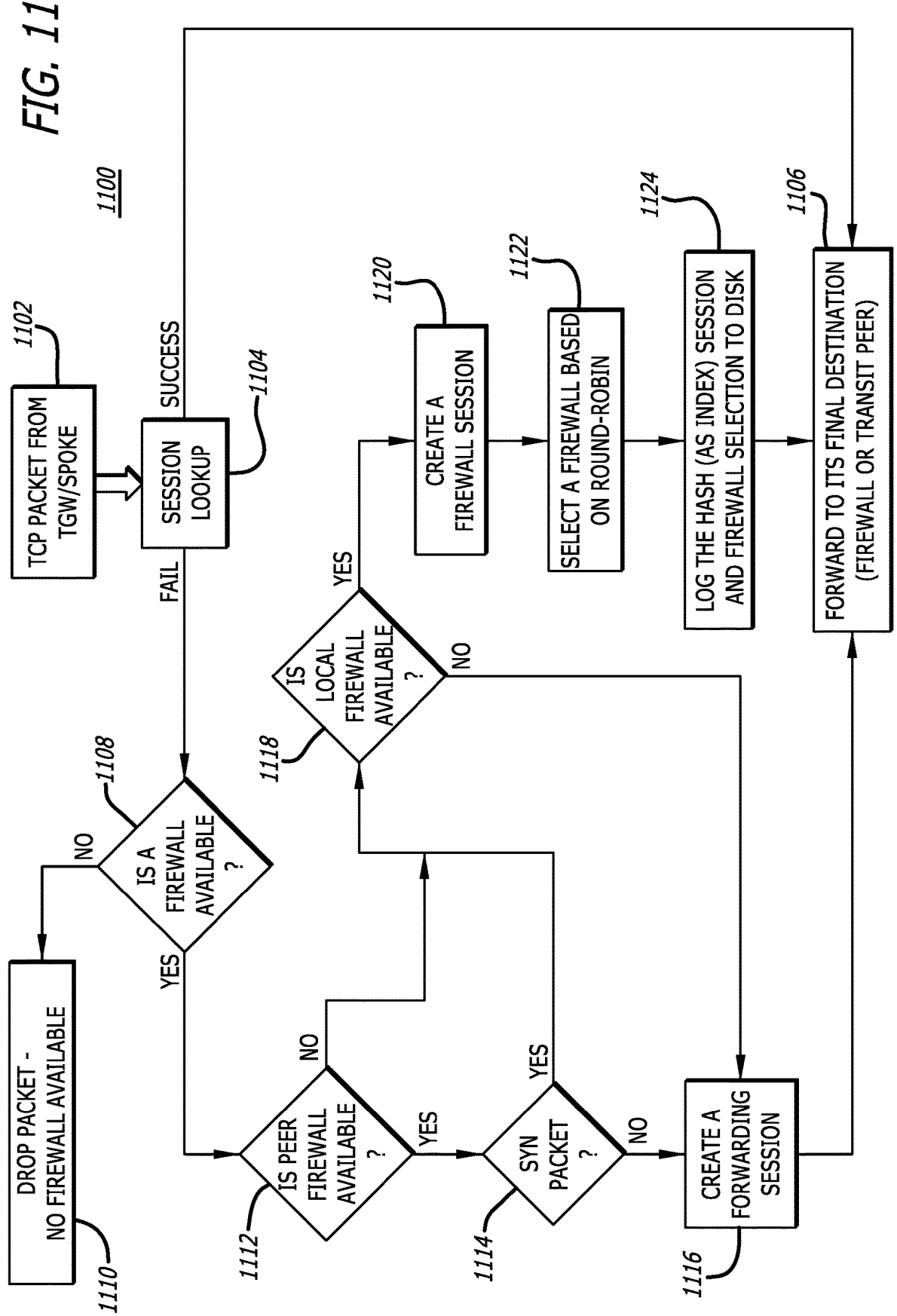

SYSTEMS AND METHODS FOR LOAD BALANCING NETWORK TRAFFIC AT FIREWALLS DEPLOYED IN A CLOUD COMPUTING ENVIRONMENT

CROSS-REFERENCE TO RELATED APPLICATIONS

This application claims the benefit of priority on U.S. Provisional Application No. 63/069,653, filed Aug. 24, 2020, the entire contents of which is incorporated by reference herein.

FIELD

Embodiments of the disclosure relate to the field of firewall instance deployment. More specifically, one embodiment of the disclosure is directed to implementation of a load balancing methodology in providing network traffic to firewall instances within a cloud computing environment.

GENERAL BACKGROUND

As companies transition from primarily hosting computing resources locally, e.g., hosting server and storage devices at on-premise data centers, to primarily utilizing such resources of a commercial provider to perform computing workloads remotely via the internet, e.g., utilizing cloud computing resources, an emphasis has been placed on the security of data and processing hosted within the cloud computing resources. Cloud computing resources provided by a commercial provider are often referred to as a "public cloud." Portions of the public cloud, which may be referred to as virtual private cloud networks (VPCs) or virtual private networks (VNETs), may be provisioned for individuals or individual companies. As both VPCs and VNETs are known, the terms will be used interchangeably unless otherwise stated with a particular embodiment. For purposes of clarity, the term VPC will be used generally throughout the disclosure.

It has become common place for a company to utilize a plurality of VPCs within the public cloud to segment portions of their business computing operations. Further, domains may be established that segment, or group, VPCs such that VPCs cannot exchange traffic with a VPC in a separate domain unless specifically configured (e.g., preventing east-west traffic between VPCs of separate domains). VPCs within a domain may be attached to gateway deployed with that domain, where the gateway is a software instance that controls routing of traffic between the VPCs deployed within the particular domain. Further, a transit gateway may be utilized to route traffic between VPCs, or outside of the public cloud, based on configurations and policies.

As mentioned above, an emphasis has been placed on the security of the data and computing resources and one well-known technique to secure data and processing within the public cloud and other software-defined networks is the utilization of virtual firewalls. Generally, virtual firewalls operate to either grant or reject network access to traffic flows. Virtual firewalls provide for the ability to inspect and control north-south and east-west traffic associated with a VPC.

In some embodiments, a controller operating within a virtual cloud network may deploy one or more spoke VPCs and a "security" VPC, where traffic from the spoke VPCs is routed to the security VPC, which inspects the traffic before the traffic is routed to a separate spoke VPC or egress traffic, e.g., internet bound. The inspection may be performed by one or more firewalls processing within the security VPC. In some embodiments, the controller may indicate certain portions of network traffic that are to be inspected and certain portions that are not to be inspected.

Currently, there are two conventional solutions for deploying a firewall within a virtual cloud network. A first conventional solution is the utilization of a virtual private network (VPN) connection between the transit gateway of the virtual cloud network and the firewall instance. Referring to FIG. 1A, a diagram is shown illustrating a portion of a cloud computing environment 100 including a transit gateway 102, a VPC 104, where a VPN deployment is utilized to connect a plurality of firewall instances $106_1$-$106_i$ (where i≥1, and i=3 in the embodiment) with the transit gateway 102.

The VPN deployment requires, for each firewall instance $106_1$-$106_3$, the generation of an Internet Protocol Security (IPSec) tunnel $108_1$-$108_3$ between the transit gateway 102 and the firewall instance $106_1$-$106_3$, the use of the Border Gateway Protocol (BGP), the use of equal-cost multi-path (ECMP) routing and the use of Secure Network Address Translation (SNAT). As the VPN deployment requires an IPSec tunnel, traffic flow is limited to 1 Gbps; however, a single firewall instance may only perform at 500 Mbps since the IPSec tunnel is traversed twice as firewalls require symmetric traffic which the firewall inspects a request and expects a response. Further, the use of IPSec tunnels, BGP, ECMP and SNAT is computationally expensive. Additionally, with the utilization of SNAT with a firewall, the destination of the traffic loses the visibility of the source of the traffic.

The second conventional solution is the utilization of the native VPC attachment mechanism of the transit gateway, e.g., native to a transit gateway deployed as part of the platform of some commercial cloud providers, such as transit gateways deployed by Amazon Web Services®. In such a solution, the security VPC appears to the transit gateway as a normal spoke VPC where only a single firewall may receive traffic from the transit gateway and the firewall appears as an application. Further, with utilization of the native VPC attachment, an active firewall and standby firewall deployment are required without the ability to scale beyond such a configuration. Referring to FIG. 1B, a diagram is shown illustrating a portion of a cloud computing environment 110 including the transit gateway 102, the VPC 104, where a VPC deployment is utilized to connect an active firewall instance 112 to the transit gateway 102 through the native connection 116 with the firewall instance 114 in standby. As illustrated, the transit gateway 102 connects directly to an interface of the active firewall instance 112, such as a LAN interface (also referred to as a "trusted interface").

However, what is needed is a system architecture and methodology for deploying a plurality of firewall instances within a security VPC such that attachment of the security VPC to the transit is not limited by a requirement to form a VPN connection between each firewall instance and the transit gateway.

BRIEF DESCRIPTION OF THE DRAWINGS

Embodiments of the disclosure are illustrated by way of example and not by way of limitation in the figures of the accompanying drawings, in which like references indicate similar elements and in which:

FIG. 11 is a flowchart of a method of directing transmission of a Transmission Control Protocol (TCP) packet received from a spoke or transit gateway and implementing load balancing at a gateway within a security VPC in accordance with some embodiments;

DETAILED DESCRIPTION

Figure 1A:
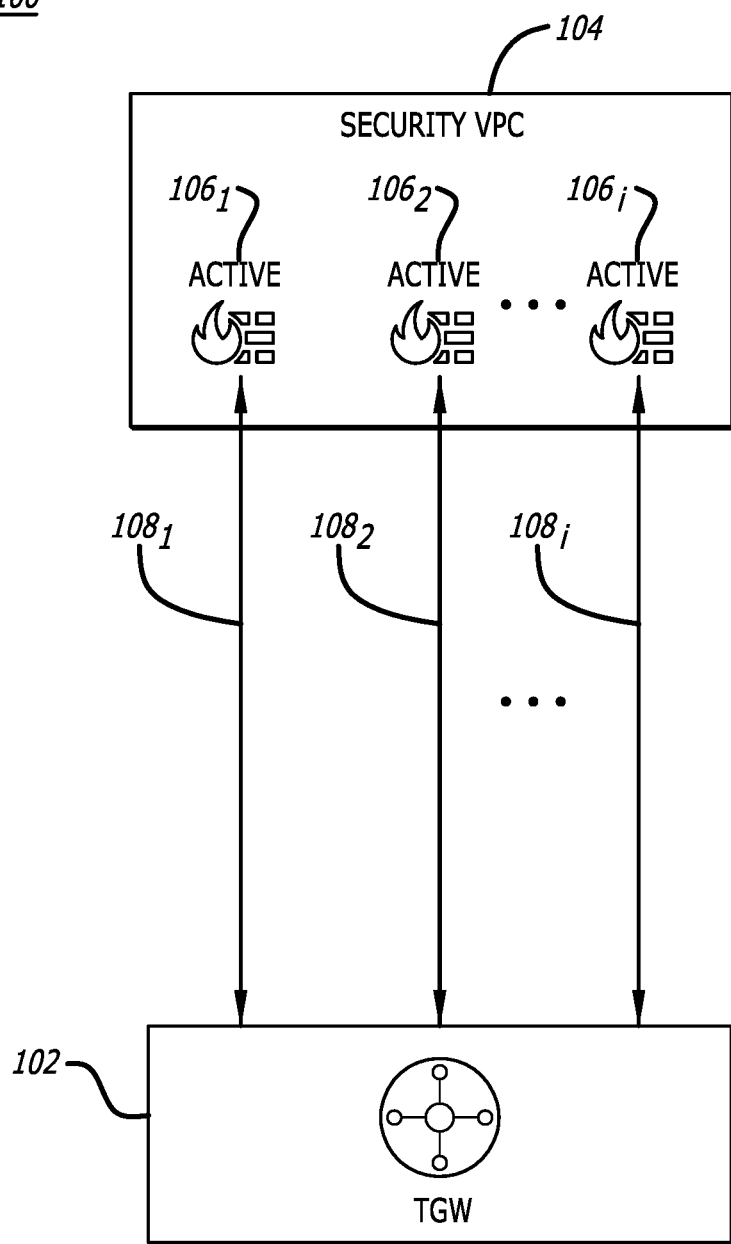
FIG. 1A is a diagram of an exemplary embodiment of a transit gateway using a native virtual private network (VPN) function to connect to a plurality of firewall instances deployed within a virtual private cloud network (VPC) in accordance with some embodiments.

Embodiments of the disclosure are directed to distributed cloud computing system including a controller configured to deploy a transit gateway, one or more spoke virtual private cloud networks (VPCs) and a security VPC, where the security VPC includes one or more gateways deployed therein and one or more firewalls connected to each gateway. The distributed cloud computing system is configured to facilitate spoke VPC to spoke VPC communication routing network traffic through the transit gateway. Additionally, the network traffic may be routed to the security VPC for inspection by a firewall instance prior to routing the network traffic to a destination spoke VPC.

Other embodiments of the disclosure are directed to a distributed cloud computing system including a controller configured to deploy one or more spoke virtual private cloud networks (VPCs) and a security transit VPC, where the security transit VPC includes one or more gateways deployed therein and one or more firewalls connected to each gateway. The distributed cloud computing system is configured to facilitate spoke VPC to spoke VPC encrypted communication routing network traffic through the security transit VPC for inspection by a firewall instance prior to routing the network traffic to a destination spoke VPC.

I. Terminology

In the following description, certain terminology is used to describe features of the invention. In certain situations, the term "logic" is representative of hardware, firmware, and/or software that is configured to perform one or more functions. As hardware, the logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "computerized" generally represents that any corresponding operations are conducted by hardware in combination with software and/or firmware.

The term "construct" may be construed as a virtual or physical logic directed to a particular functionality such as a gateway, virtual private cloud network (VPC), sub-network, or the like. For instance, as an illustrative example, the construct may correspond to virtual logic in the form of software (e.g., a virtual machine), which may assign a device-specific address (e.g., a Media Access Control "MAC" address) and/or an IP address within an IP address range supported by to a particular IP subnet. Alternatively, in some embodiments, the construct may correspond to physical logic, such as an electronic device that is communicatively coupled to the network and assigned the MAC and/or IP address(es). Examples of electronic devices may include, but are not limited or restricted to a personal computer (e.g., desktop, laptop, tablet or netbook), a mobile phone, a standalone appliance, a sensor, a server, or an information routing device (e.g., a router, bridge router ("brouter"), etc.). It is contemplated that each construct may constitute at least logic residing as part of a public network, although certain constructs may be deployed as part of an "on-premises" ("on-prem" or local) network.

The term "virtual private cloud network (VPC)" may refer to an on-demand, configurable pool of shared resources, which are allocated within a cloud computing platform and provide a certain level of isolation between the different organizations or other entities (hereinafter, "users") using the resources.

The term "transit VPC" may refer to a VPC that is configured, in accordance with one embodiment, to connect multiple VPCs, where the VPCs may be logically isolated and/or virtually located on data centers that may be geographically disparate. A transit VPC serves as a global network transit center that operates as a connection point for spoke VPC-to-spoke VPC communication (e.g., propagation of network traffic having a source IP address in a first spoke VPC and a destination IP address in a second spoke VPC), spoke VPC-to-data center communication (e.g., propagation of network traffic having a source IP address in a first spoke VPC and a destination IP address at a data center), and may also route network traffic to other transit VPCs (e.g., propagation of network traffic having a source IP address in a first spoke VPC connected to a first transit VPC and a destination IP address in a second spoke VPC connected to a second transit VPC), which may then continue propagation of the network traffic.

The term "gateway" may be construed as virtual or physical logic. For instance, as an illustrative example, the gateway may correspond to virtual logic in the form of a software component, such as a virtual machine (VM)-based data routing component that is assigned a Private IP address within an IP address range associated with a VPC including the gateway. The gateway allows Cloud Service Providers (CSPs) and enterprises to enable datacenter and cloud network traffic routing between virtual and physical networks, including a public network (e.g., Internet). Alternatively, in some embodiments, the gateway may correspond to physical logic, such as an electronic device that is communicatively coupled to the network and assigned the hardware (MAC) address and an IP address.

Hence, multiple gateways may be deployed in a VPC and these gateways may be configured to control the flow of traffic from software instances of the VPC to one or more remote sites including computing devices that may process data received from the software instances. Having similar architectures, the gateways may be identified differently based on their location/operability within a public cloud network platform. The "spoke" gateways are configured to interact with targeted instances while "transit" gateways are configured to further assist in the propagation of data traffic (e.g., one or more messages) directed to a spoke gateway within a spoke VPC or a computing device within an on-premises network. Stated differently, a spoke gateway interacts with a user instance while a transit gateway is configured as a hub that routes network traffic. Typically, a transit gateway instance requires more memory and supports additional configurations as compared to a spoke gateway.

The term "controller" may refer to a software instance deployed within a cloud computing environment (e.g., resources of a public cloud network) that manages operability of certain aspects of one or more cloud computing environments spanning across different public cloud networks (multi-cloud network). For instance, a controller may be configured to collect information pertaining to each VPC and/or each gateway and configures one or more routing tables associated with one or more VPCs and/or gateways spanning a multi-cloud network to establish communication links (e.g., logical connections) between different sources and destinations. These sources and/or destinations may include, but are not restricted or limited to on-premises computing devices, gateways or other types of cloud resources.

The term "message" generally refers to information in a prescribed format and transmitted in accordance with a suitable delivery protocol. Hence, each message may be in the form of one or more packets, frames, or any other series of bits having the prescribed format.

The term "network device" may be construed as any electronic computing system with the capability of processing data and connecting to a network. Such a network may be a public network such as the internet or a private network such as a wireless data telecommunication network, wide area network, a type of local area network (LAN), or a combination of networks. Examples of a network device may include, but are not limited or restricted to, an endpoint device (e.g., a laptop, a mobile phone, a tablet, a computer, etc.), a standalone appliance, a server, a router or other intermediary communication device, a firewall, etc.

The term "link" may be generally construed as a physical or logical communication path between two or more constructs. For instance, as a physical communication path, wired and/or wireless interconnects in the form of electrical wiring, optical fiber, cable, bus trace, or a wireless channel using infrared, radio frequency (RF), may be used. A logical communication path includes any communication scheme that enables information to be exchanged between multiple constructs.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. Firewall Network Architecture

Figure 2A:
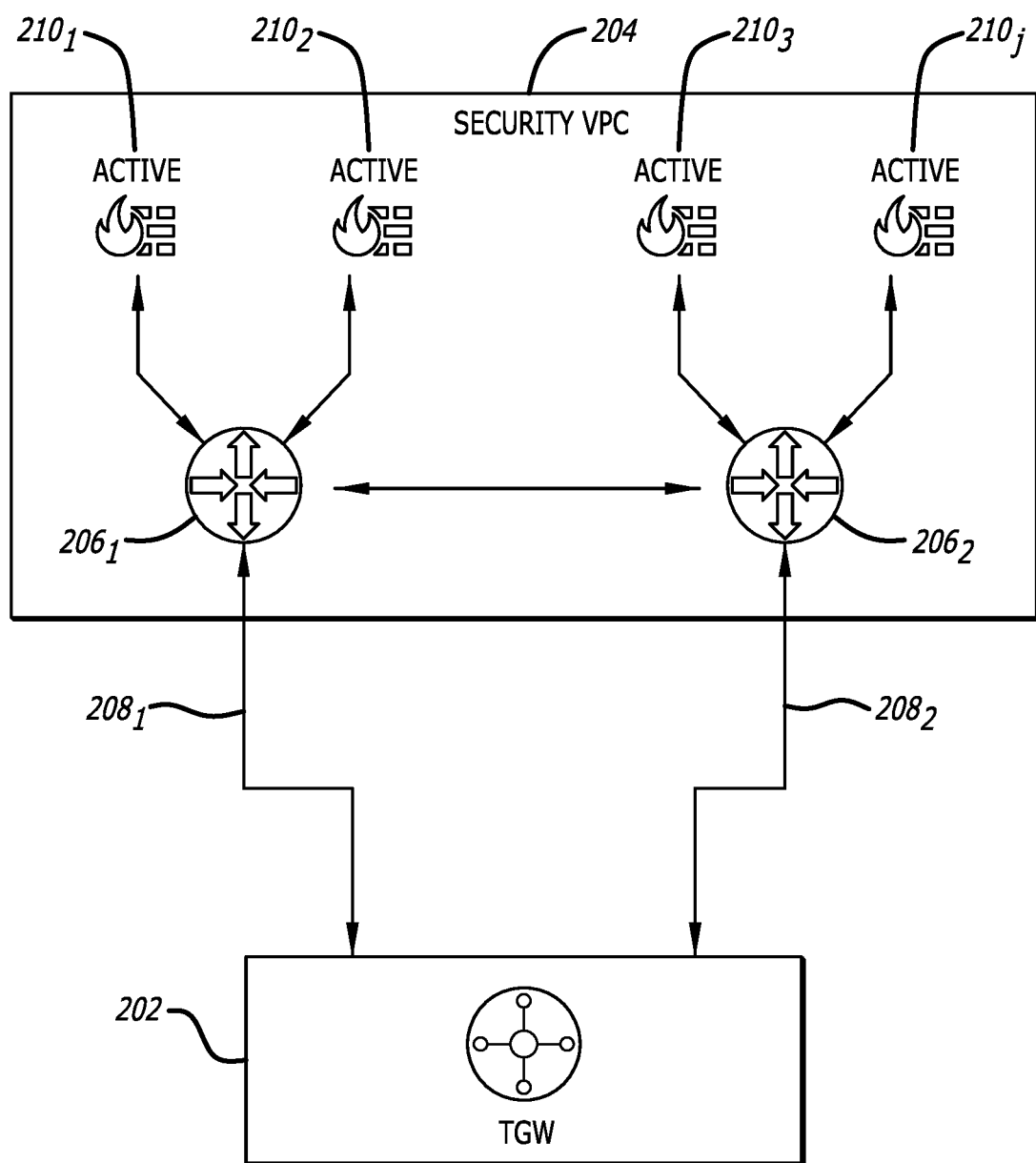
FIG. 2A is a diagram of an exemplary embodiment of a transit gateway using a VPC attachment methodology to connect to one or more gateways using a firewall network architecture, where the one or more gateways are coupled with a plurality of firewall instances deployed within a virtual private cloud network (VPC) in accordance with some embodiments.

Referring now to FIG. 2A, a diagram of an exemplary embodiment of a transit gateway using a VPC attachment methodology to connect to one or more gateways using a firewall network architecture, where the one or more gateways are coupled with a plurality of firewall instances deployed within a virtual private cloud network (VPC) is shown in accordance with some embodiments. For example, the VPC 204 may be referred to as a security VPC that is used to deploy a plurality of firewall instances and inspect network traffic as is illustrated in at least FIGS. 3A-3C and 6-7D. The architecture enabling the configuration illustrated in FIGS. 2A-3C and 6-7D including the deployment of a plurality of firewall instances connected to one or more gateways within a VPC may be referred to as a firewall network architecture.

Figure 2B:
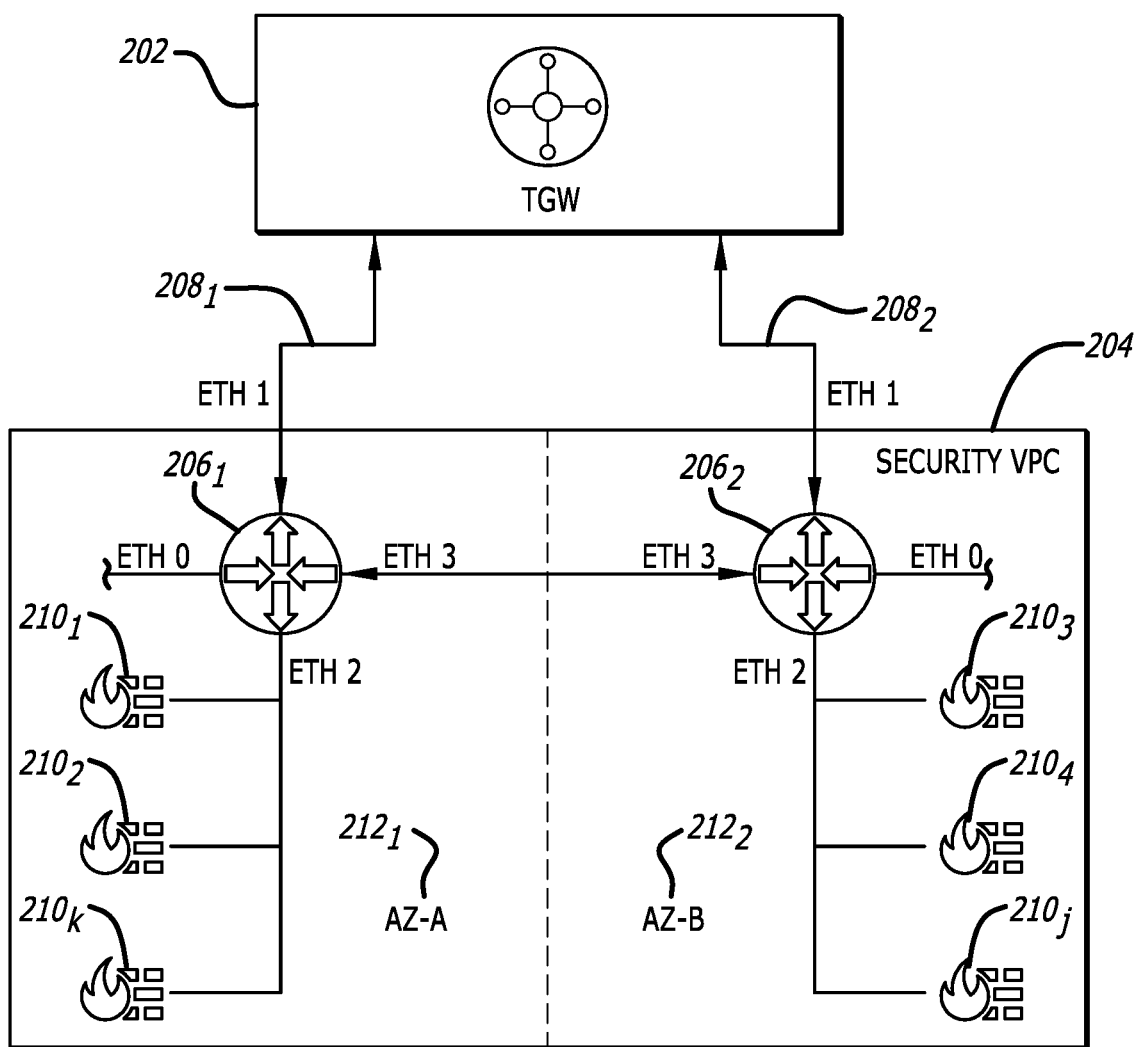
FIG. 2B is a diagram of an exemplary embodiment of the private interface for two gateways deployed within a VPC in accordance with some embodiments.

Within the VPC 204, one or more spoke gateways $206_1$-$206_2$ may be deployed, where each spoke gateways $206_1$-$206_2$ connects to the transit gateway 202 using a native VPC attachment. As shown in FIG. 2B, each of the spoke gateways $206_1$-$206_2$ connects to the transit gateway 202 through a specified private network interface via connections $208_1$-$208_2$. It should be noted that additional spoke gateways may be deployed; however, FIG. 2A illustrates two for purposes of clarity. In some embodiments, the gateways $206_1$-$206_2$ may be in direct communication with each other, where such a configuration may be referred to an as "active-active" configuration. Additionally, one or more firewall instances $210_1$-$210_j$ (where j≥1, and j=4 for this embodiment) may be deployed and connected to the gateways $206_1$-$206_2$. When the gateways instances $206_1$-$206_2$ are deployed in the active-active configuration, the gateways instances $206_1$-$206_2$ share a routing table to maintain a record of packet flow routing among firewall instances $210_1$-$210_j$ connected thereto.

As the security VPC 204 and the transit gateway 202 configuration of FIG. 2A implements a firewall network architecture where the transit gateway 202 connects directly to an ethernet interface of the gateways $206_1$-$206_2$, as discussed below and shown in FIG. 2B, such a configuration does not suffer from the same technical limitations and disadvantages of current technology shown in FIGS. 1A-1B. In particular, the configuration of FIG. 2A does not utilize the VPN connection of FIG. 1A so the use of IPSec tunnels, BGP, ECMP and SNAT are not required and not implemented. Therefore, the throughput restrictions of FIG. 1A due to the use of IPSec tunnels is not present in the firewall network architecture of FIG. 2A. Additionally, although the configuration of FIG. 1A is able to scale, IPSec tunnels, BGP, ECMP and SNAT are computationally expensive, thus providing a large technical disadvantage compared to the firewall network architecture, which scales without such computational expense. Further, as SNAT is not implemented, there is no loss of visibility of the source of the traffic.

Figure 1B:
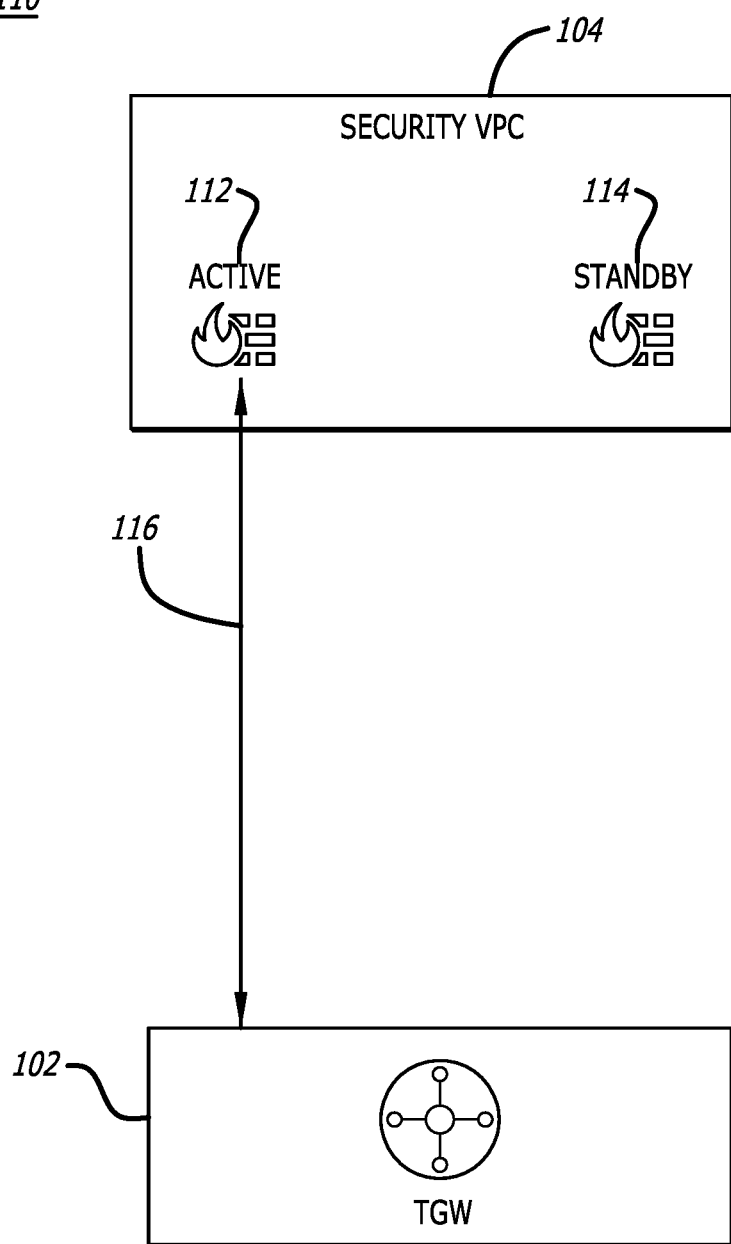
FIG. 1B is a diagram of an exemplary embodiment of a transit gateway using a VPC attachment methodology to connect to an active firewall instance deployed within a VPC in accordance with some embodiments.

The firewall network architecture of FIG. 2A is not restricted by the scaling limitations of the configuration of FIG. 1B. Specifically, the native VPC of a transit gateway enables a direct connection to a single firewall and an active-standby configuration is required. In contrast, the firewall network architecture of FIG. 2A provides for scaling as (i) multiple gateways may directly connect to the transit gateway in an active-active configuration as seen in FIG. 2A, and (ii) a plurality of firewall instances may be deployed behind each gateway. As a cloud computing environment may include tens, hundreds or even thousands of spoke VPCs and the security VPC 204 is utilized to inspect network traffic according to domains and policies, scaling is integral to efficient operation. As each firewall instance $210_1$-$210_j$ has limited throughput, scaling the number of firewall instances connected to each gateway $206_1$-$206_2$ provides an important technical advantage over the current technology.

Referring to FIG. 2B, a diagram of an exemplary embodiment of the interfaces of two gateways deployed within a VPC is shown in accordance with some embodiments. FIG. 2B may illustrate the transit gateway 202 and the security VPC 204 as seen in FIG. 2A, where the transit gateway 202 is directly connected to each gateway $206_1$-$206_2$ deployed within the VPC 204. Specifically, FIG. 2B illustrates that each $206_1$-$206_2$ includes a plurality of interfaces, which may encompass both public and private interfaces. Referring to the gateway $206_1$, four interfaces are shown including a management interface (eth0), a transit gateway interface (eth1), a firewall instance interface (eth2) and a high-availability (HA) gateway interface (eth3). In some embodiments, eth0 may be public interface while eth1-eth3 are private interfaces.

FIG. 2B illustrates that the transit gateway 202 connects directly to each gateway $206_1$-$206_2$ using eth1. Further, eth2 operates as the interface for one or more firewall instances $210_1$-$210_k$ and eth3 operates to connect the gateway $206_1$ to the gateway $206_2$. It is noted that the connection between the eth3 interfaces enables a "high availability" configuration (or "active-active" configuration) in which both gateways $206_1$-$206_2$ may actively receive network traffic from the transit gateway 202, in contrast to the configuration of FIG. 1B.

It is further noted that FIG. 2B illustrates that the deployment of multiple gateways $206_1$-$206_2$ within the VPC 204 enable the ability to configure the VPC 204 with multiple availability zones $212_1$-$212_2$ (e.g., to segment the VPC 204 into multiple compartments).

Figure 3A:
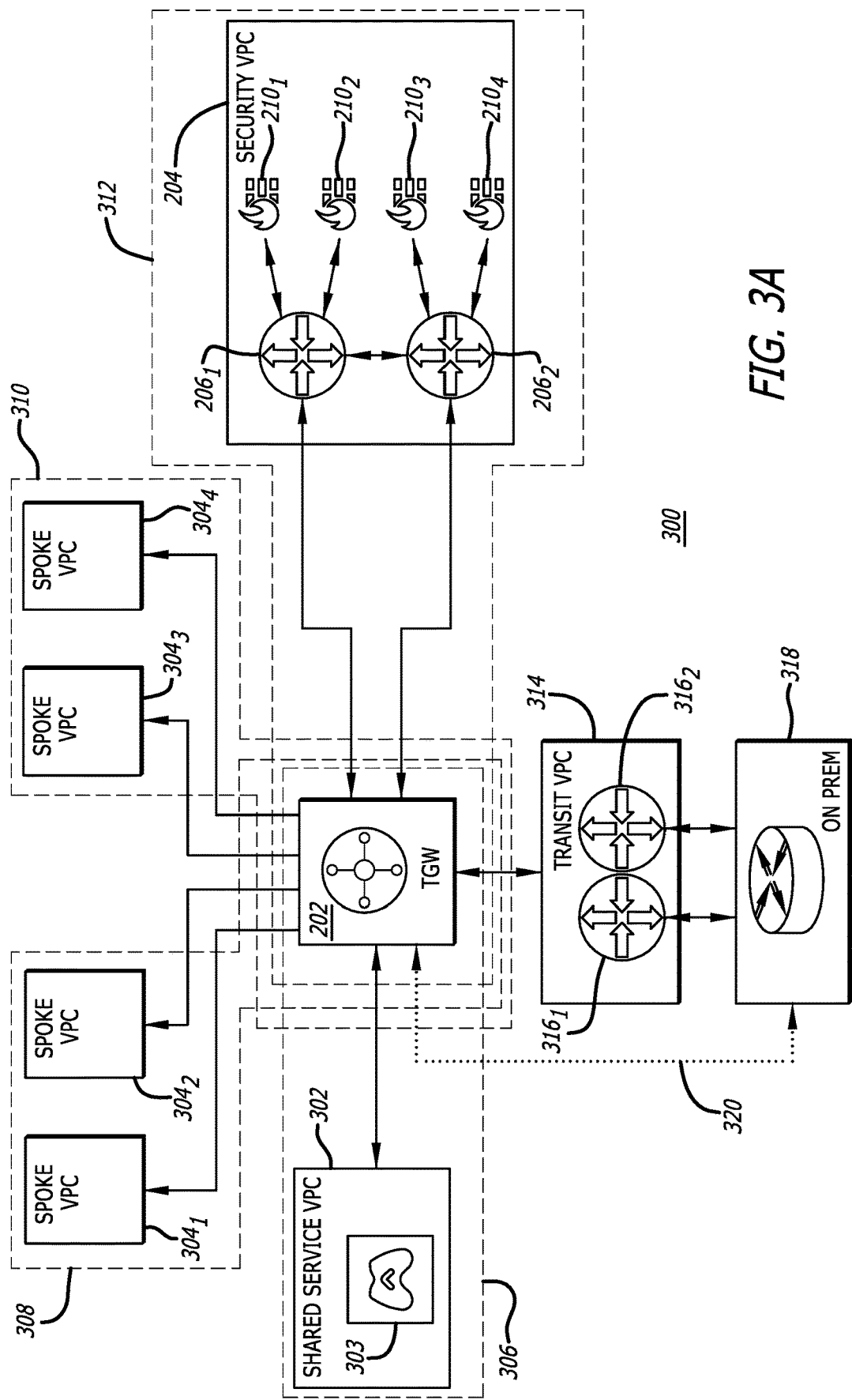
FIG. 3A is a diagram of an exemplary embodiment of a plurality of VPCs attached to a transit gateway, where one or more firewall instances are deployed in at least a subset of the plurality of VPCs and attached to a transit gateway using the firewall architecture of FIG. 2A in accordance with some embodiments.

Referring to FIG. 3A, a diagram of an exemplary embodiment of a plurality of VPCs attached to a transit gateway, where one or more firewall instances are deployed in at least a subset of the plurality of VPCs and attached to a transit gateway using the firewall architecture of FIG. 2A is shown in accordance with some embodiments. FIG. 3A illustrates a cloud computing environment 300 that is comprised of the transit gateway 202, the security VPC 204 that includes the gateways $206_1$-$206_2$ and the firewall instances $210_1$-$210_4$. Additionally, the cloud computing environment 300 includes a VPC 302 that deploys a controller 303 (where the VPC 302 may be referred to as a shared services VPC), a plurality of spoke VPCs $304_1$-$304_4$ (also referred to as spoke VPCs) and, optionally, a VPC 314 deploying one or more gateways $316_1$-$316_2$ (where the VPC 314 may be referred to as a transit VPC or a security transit VPC). The gateways $316_1$-$316_2$ may be deployed in the active-active configuration as discussed above and illustrated in FIG. 2B.

The controller 303 may operate to launch each of the firewall instances $210_1$-$210_4$ and to monitor the health of each. The health of each firewall instance $210_1$-$210_4$ may be monitored in at least two methods including: (1) transmission of a ping from the transit gateway 202, and (2) transmission of a ping from the controller 303. When the return ping indicates that a firewall instance is down, the firewall instances is detached from the applicable gateway. The controller 303 may also operate to reattach a firewall instance that was previously detached once that firewall instance gains a healthy status.

Although load balancing operations performed by the gateways $206_1$-$206_2$ are discussed in further detail below, when a firewall instance is reattached or a new firewall instance is launched and attached, the gateways $206_1$-$206_2$ perform load balancing operations to distribute new packet flows to the newly attached firewall instance. Similarly, when a firewall instance is detached, instead of redistributing all existing spoke VPC sessions (e.g., rehashing and redistributing), only the affected spoke VPC sessions are rehashed and redistributed. For example, a firewall instance expects symmetric traffic, thus as a packet flow from a first spoke VPC to a second spoke VPC is inspected, a spoke VPC session is created and recorded such that the return packet flow will be inspected by the same firewall instance (when there are a plurality of firewall instances as in FIG. 3A).

In some embodiments, the transit gateway 202 may exchange network traffic with a data center (or other network devices or software components) located or deployed on-prem 318 (collectively "on-prem components 318") through an indirect connection via the transit VPC 314. In other embodiments, the transit gateway 202 may be directly connected to on-prem components 318, e.g., via a VPN connection 320.

The configuration provided in the cloud computing environment 300 provides for spoke VPC to spoke VPC communication without the need to create a full mesh network between spoke VPCs as the transit gateway serves to route network traffic. In current cloud computing environment configurations, a spoke VPC does not communicate with another Spoke VPC without a full mesh network. However, in the configuration of FIG. 3A, spoke VPC $304_1$ may communicate with, for example, spoke VPC $304_2$ by transmitting network traffic to the transit gateway 202, which in turn routes the network traffic to the VPC $304_2$. Similarly, the spoke VPC $304_1$ may communicate with on-prem components 318 by transmitting network traffic to the transit gateway 202, which in turn transmits the network traffic to on-prem components 318, either indirectly through the transit gateway 314 or directly via the connection 320.

FIG. 3A also illustrates the concept of domains, which operate to isolate a spoke VPC or groups of spoke VPCs, wherein the group of spoke VPCs within a domain may communicate freely (e.g., without inspection). Establishment of domains and assignment of particular spoke VPCs to domains serves to isolate or segregate operations or applications performed by one group of spoke VPCs from those of another group of spoke VPCs. Further, by default, network traffic from a first domain cannot be transmitted to a second domain; however, policies may be established that enable such communication, for example, following inspection by a firewall instance within the security VPC 204. The policies may be configured through and enforced by the controller 303. For instance, the controller 303 may control or alter a route table of the transit gateway 202, thereby dictating network traffic flow. However, it should be understood that policies may be configured that VPCs in a first domain may communicate with VPCs in a second domain without inspection.

As shown, the cloud computing environment 300 includes four domains 306, 308, 310 and 312. The domain 306 includes the shared services VPC 302 and may be referred to as a shared services domain. In some embodiments, a policy may be configured to enable any spoke VPC $304_1$-$304_4$ to communicate with the controller 303.

The domain 308 includes the spoke VPCs $304_1$-$304_2$ and may represent a development domain, while the domain 310 includes the spoke VPCs $304_3$-$304_4$ and may represent a product domain. Further, the cloud computing environment 300 may include the domain 312 that includes the security VPC 204 and represents a security domain.

Thus, the configuration of the cloud computing environment 300 isolates a development environment from a production environment. One policy configuration for this scenario is such that the spoke VPCs $304_1$-$304_2$ in the dev domain 308 are unable talk to the spoke VPCs $304_3$-$304_4$ in the prod domain 312. A security domain can have one or more spoke VPCs as its members; however, spoke VPCs within the same domain can communicate to each other via the transit gateway 202.

More specifically, one technical advantage illustrated in FIG. 3A compared to the architectures set forth in FIGS. 1A-1B is the ability for the gateways $206_1$-$206_2$ to provide visibility of network metrics to a network administrator or other user. For instance, the gateways $206_1$-$206_2$ may record metrics for all network traffic that is inspected including, but not limited or restricted to, an ingress interface, a source IP address, a destination IP address, the IP protocol, etc. As a result, the controller may obtain such metrics and create a visible history of all network traffic routing through the cloud computing environment 300. Additionally, when two or more commercial cloud providers provide cloud resources (e.g., regions for deploying VPCs), the utilization of a transit gateway to route network traffic through the cloud computing environment provides the technical benefit of obtaining visibility of network traffic flow in a multi-cloud environment, which is not capable of being provided by current solutions. Specifically, current cloud providers do not provide for such technical advantages.

Additionally, to provide for additional metrics, each gateway $206_1$-$206_2$ may capture forwarding packets within a packet flow for a period of time. Upon capturing the forwarding packets, the gateways $206_1$-$206_2$ may record a specified host, port, network interface and packet length. The throughput of each gateway $206_1$-$206_2$ may also be recorded.

The tracked network traffic and recorded the metrics of the components within the cloud computing environment 300 may be displayed to an administrator in a single location (e.g., in a single dashboard). Further, the administrator may also adjust the configuration of the regions from the single dashboard. Such is not currently possible in the current state of cloud computing technology, especially when multiple commercial cloud providers provide individual regions.

Figure 3B:
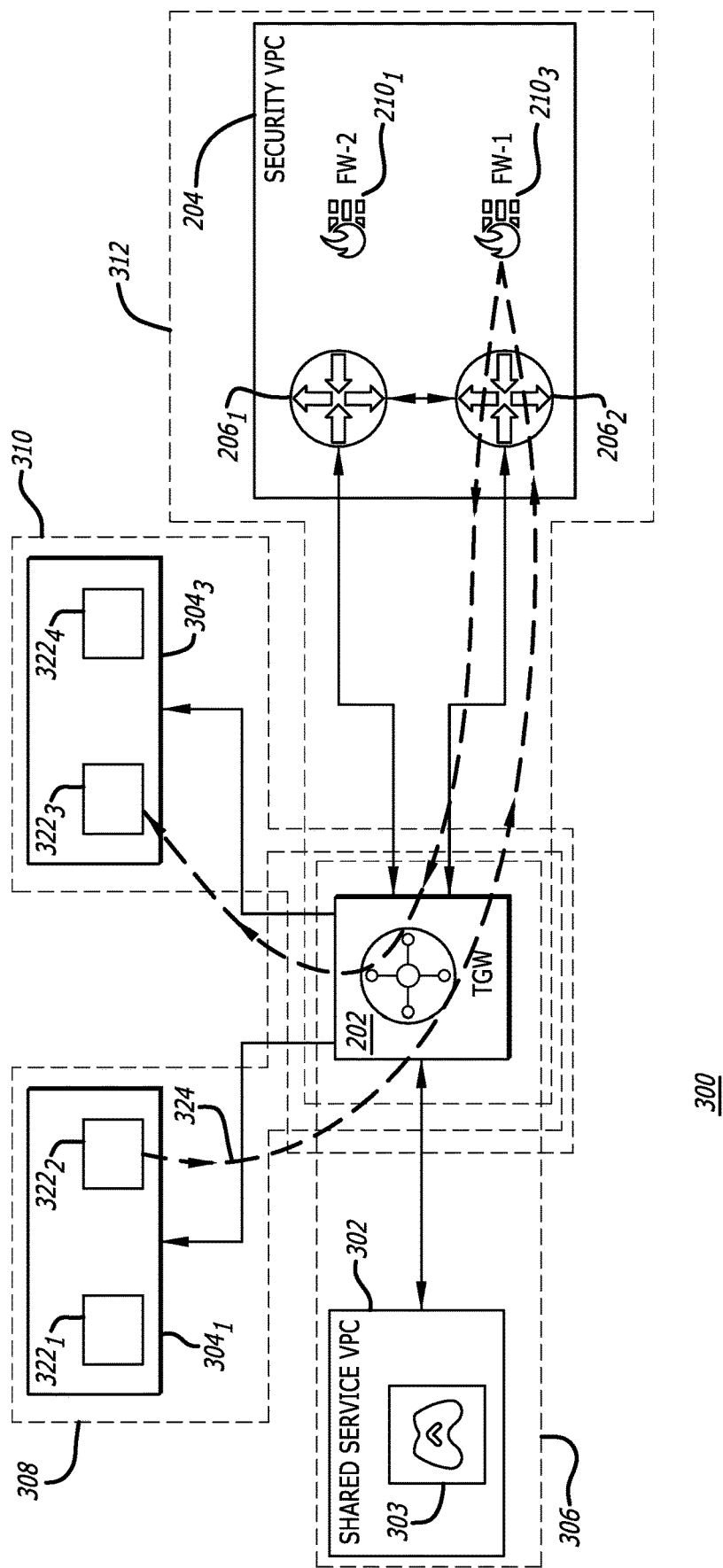
FIG. 3B is an illustration of a first packet flow through the diagram of FIG. 3A in accordance with some embodiments.

Referring to FIG. 3B, an illustration of a first packet flow through the diagram of FIG. 3A is shown in accordance with some embodiments. FIG. 3B illustrates the cloud computing environment 300 of FIG. 3A and further illustrates that one or more applications may be processing within a spoke VPC, where some spoke VPCs have been emitted from the illustration for purposes of clarity. Specifically, FIG. 3B illustrates one example of network traffic packet flow 324 originating at the spoke VPC $304_1$ to the destination spoke VPC $304_3$. The illustrated packet flow assumes that a policy has been configured enabling the exchange of network traffic between VPCs of the domains 308-310.

In the illustrated example, the packet flow 324 originates from the application $322_2$ processing within the spoke VPC $304_1$ with a destination of the application $322_2$ processing within the spoke VPC $304_3$. The packet flow 324 is routed to the transit gateway 202, which routes the packet flow 324 to the gateway $206_2$, which provides the packet flow 324 to the firewall instance $206_2$ for inspection. In some embodiments, following inspection, the packet flow 324 is routed back to the gateway $206_2$, which routes the packet flow 324 to the transit gateway 202, which in turn routes the packet flow 324 to the destination application $322_3$. However, in other embodiments, the packet flow 324 is routed from the firewall instance $210_3$ directly to the transit gateway 202, which in turn routes the packet flow 324 to the destination application $322_3$.

Figure 3C:
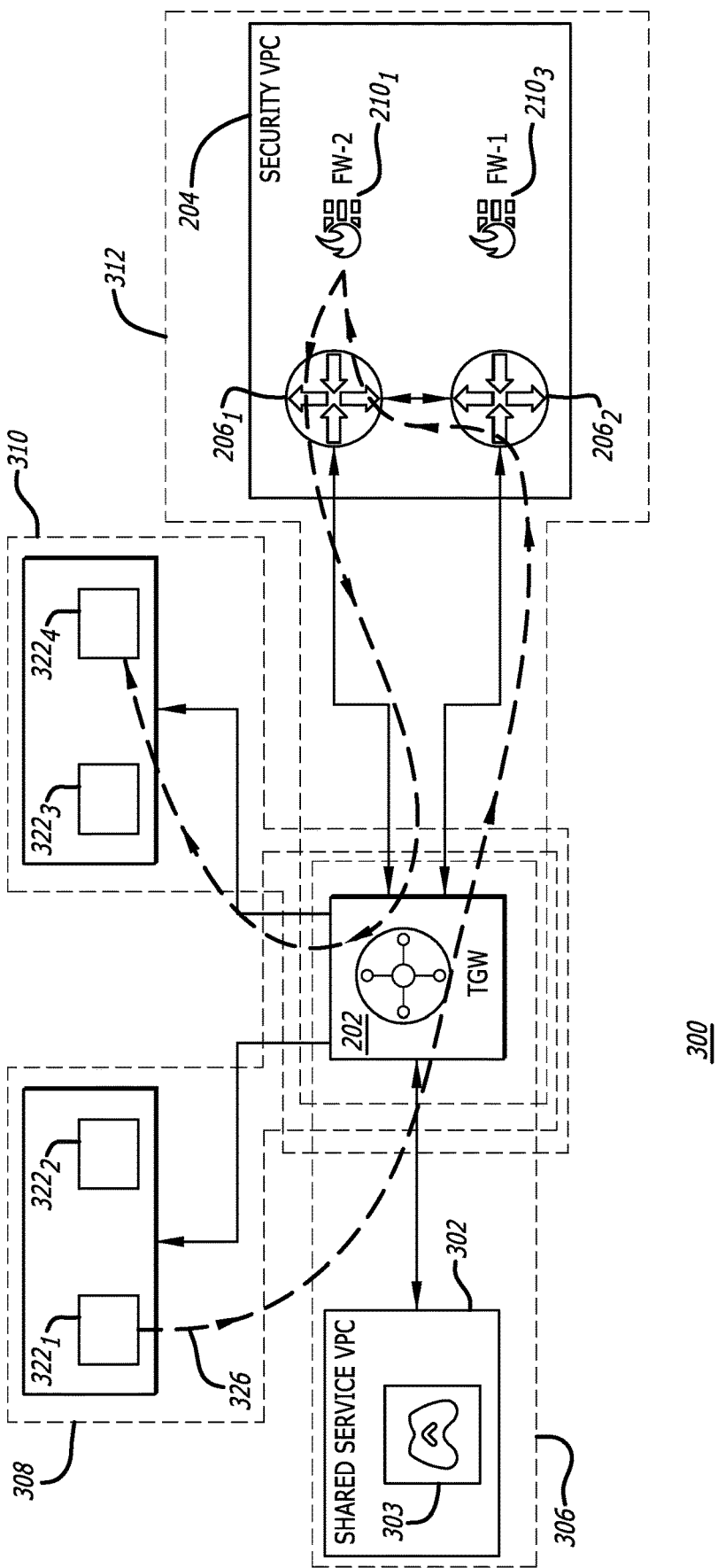
FIG. 3C is an illustration of a second packet flow through the diagram of FIG. 3A in accordance with some embodiments.

Referring to FIG. 3C, an illustration of a second packet flow through the diagram of FIG. 3A is shown in accordance with some embodiments. In particular, FIG. 3B illustrates an embodiment of packet flow when the gateways $206_1$-$206_2$ are deployed in an active-active configuration. The example illustrated in FIG. 3C may occur in at least two situations: (1) the presence of reply traffic corresponding to a prior packet flow, and (2) while implementing load balancing at the security VPC 204.

With respect to the first situation, a firewall instance expects symmetric traffic, thus reply traffic corresponding to a prior packet flow is to be inspected by the same firewall instance that inspected the prior packet flow. For example, when the packet flow 326 is transmitted from the application $322_1$ to the application $322_4$ in response to a prior packet transmitted from the application $322_4$ to the application $322_1$, the firewall instance that inspected the prior packet flow is to inspect the packet flow 326. Thus, in the event that the firewall instance $210_1$ inspected the prior packet flow, it should also inspect the packet flow 326. As the transit gateway 202 may provide the packet flow 326 to either gateway $206i$-$206_2$ when they are deployed in the active-active configuration, the gateway $206_2$ will provide the packet flow 326 to the gateway $206_1$, which provides the packet flow 326 to the firewall instance $210_1$ for inspection.

Referring to the second situation, the gateways $206_1$-$206_2$ may perform load balancing such that packet flow inspection is distributed as evenly as possible among firewall instances. When load balancing may indicate that the packet flow 326 is to be provided to the firewall instance $210_1$. As a result, the gateway $206_2$ will provide the packet flow 326 to the gateway $206_1$, which provides the packet flow 326 to the firewall instance $210_1$ for inspection. It is noted that the load balancing will not override the symmetric traffic requirement of a firewall instance.

III. Operational Flow—Firewall Network Operation

Figure 4:
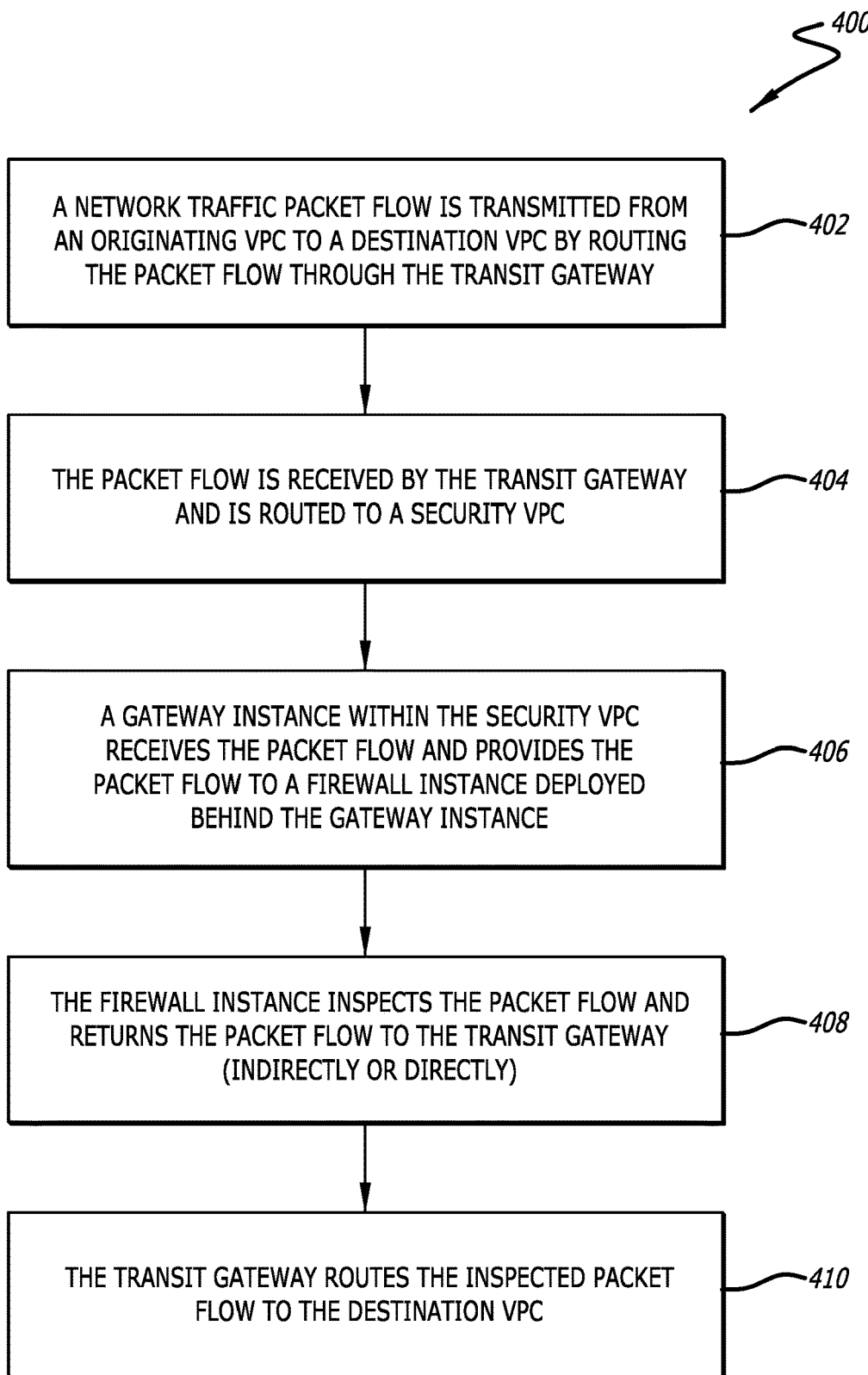
FIG. 4 is a flowchart of a method of operability of the architecture of FIG. 2A in accordance with some embodiments.

Referring now to FIG. 4, a flowchart of a method of operability of the firewall network architecture of FIG. 2A is shown in accordance with some embodiments. Each block illustrated in FIG. 4 represents an operation performed in the method 400 of routing a network traffic packet flow through a cloud computing environment deploying a security VPC using the firewall network architecture of FIG. 2A. Prior to the start of operations comprising the method 400, it is assumed that a cloud computing environment, such as the cloud computing environment 300 of FIG. 3A, is operationally functioning, e.g., a transit gateway, a controller, and one or more VPCs each deploying one or more gateways (managed by the controller) have been launched. In particular, it is assumed that the transit gateway and one of the VPCs are configured in accordance with the firewall network architecture of FIG. 2A in which the transit gateway connects to an ethernet interface of each gateway within the VPC and where one or more firewall instances are deployed behind each gateway to operate to inspect network traffic associated with the cloud computing environment.

The method 400 begins when transmission of a network traffic packet flow is initiated from an originating VPC to a destination VPC by routing the packet flow through the transit gateway (block 402). For example, with reference to FIG. 3B, transmission of packet flow 324 originates from the VPC $304_1$ with a destination of the VPC $304_2$. The packet flow is received by the transit gateway and is routed to a security VPC (block 404). In particular, the security VPC may be represented by the security VPC 204, which includes the gateways $206_1$-$206_2$ and firewall instances $210_1$-$210_4$ deployed behind the gateways $206_1$-$206_2$.

A gateway within the security VPC receives the packet flow and provides the packet flow to a firewall instance deployed behind the gateway (block 406). For example, and referring again to FIG. 3B, the packet flow 324 is routed from the transit gateway 202 to the gateway $206_2$ of the security VPC 204. Further, the gateway $206_2$ provides the packet flow 324 to the firewall $210_3$ for inspection.

The firewall instance inspects the packet flow and returns the packet flow to the transit gateway (block 408). As shown in FIG. 3B, the inspect packet flow 324 is provided back to the gateway $206_2$ and then to the transit gateway 202. However, in an alternative embodiment as also discussed above, the firewall $210_3$ may provide the inspected packet flow 324 directly to the transit gateway 202. Following inspection by a firewall instance within the security VPC, the transit gateway routes the inspected packet flow to the destination VPC (block 410).

IV. Ingress Traffic Inspection

Figure 5:
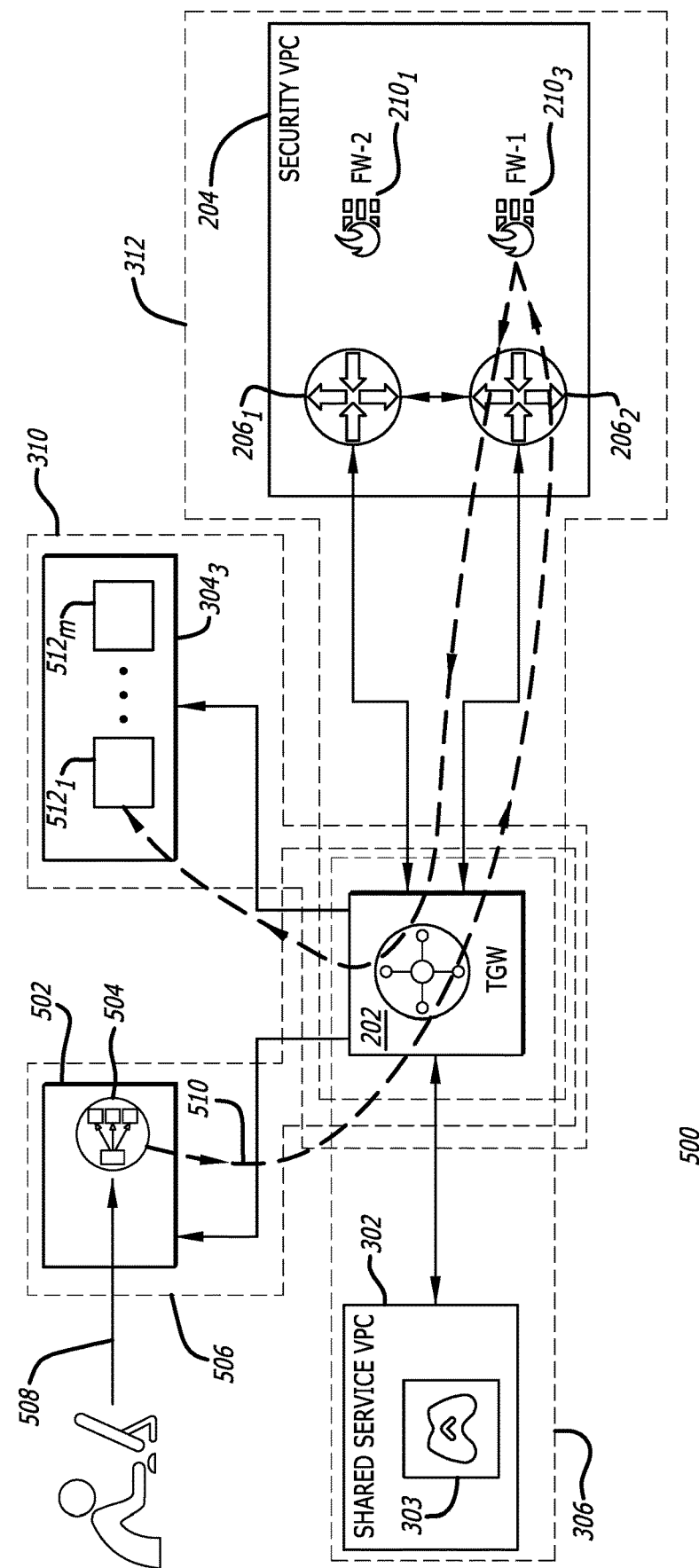
FIG. 5 is an illustration of packet flow through the diagram of FIG. 3A configured for ingress data inspection in accordance with some embodiments.

Referring now to FIG. 5, an illustration of packet flow through a cloud computing environment configured for ingress data inspection is shown in accordance with some embodiments. FIG. 5 utilizes some components of the cloud computing environment 300 of FIG. 3A; however, the dev domain 308 has been replaced with the ingress domain 506, which includes the spoke VPC 502. A load balancing application 504 is deployed within the spoke VPC 502, where the load balancing application 504 is configured to receive ingress network traffic 508 and perform load balancing to determine which application is to receive the ingress network traffic 508. For example, the ingress network traffic 508 may be an HTTPS request to be processed by any of the applications $512_1$-$512_m$ (where m≥2). The load balancing application 504 performs a load balancing process to determine which application $512_1$-$512_m$ is to process the request and subsequently route the load balanced request 510 to applicable application $512_1$-$512_m$ through the transit gateway 202. Prior to routing the request 510 to the applicable application $512_1$-$512_m$, the transit gateway 202 routes the request 510 to one of the gateways $206_1$-$206_2$ for inspection by one of the firewall instances $210_1$, $210_3$ or others as seen in FIG. 3A. As shown, the request 510 is inspected by the firewall instances $210_3$ and then routed to the application $512_1$ through the transit gateway 202, where the application $512_1$ was the application instance selected by the load balancing application 504.

As should be understood, additional domains and/or spoke VPCs not illustrated in FIG. 5 may be deployed within the cloud computing environment 500 such that the load balancing application 504 may select a spoke VPC for processing of ingress network traffic in a domain other than the prod domain 310.

V. Exemplary Use Cases—Firewall Network Deployment

Figure 6A:
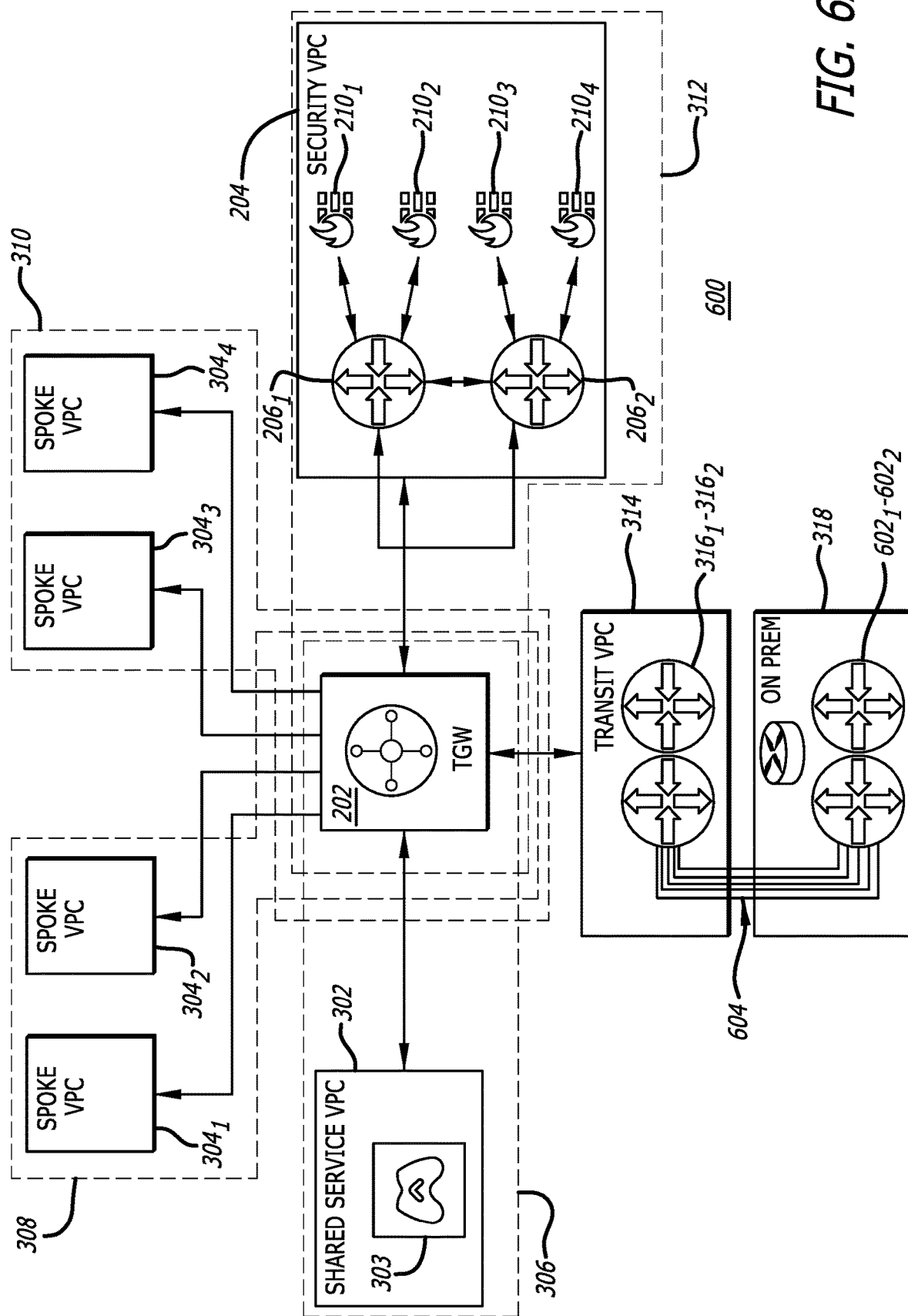
FIGS. 6A-6C are illustrations of configurations of a transit gateway using a VPC attachment methodology to connect to one or more gateways, which in turn are coupled with a plurality of firewall instances deployed within a virtual private cloud network (VPC) in accordance with some embodiments.
Figure 6B:
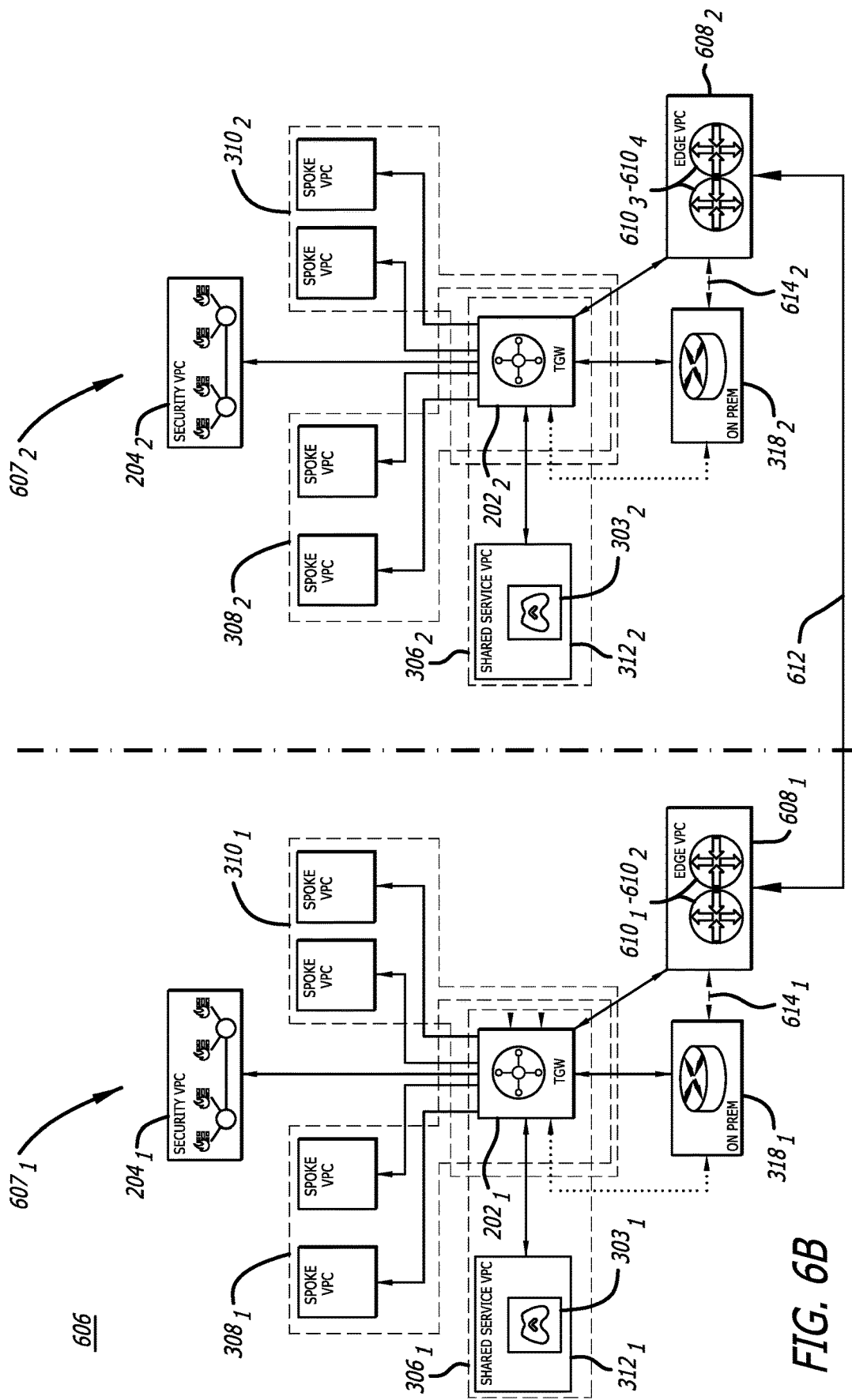
Figure 6C:
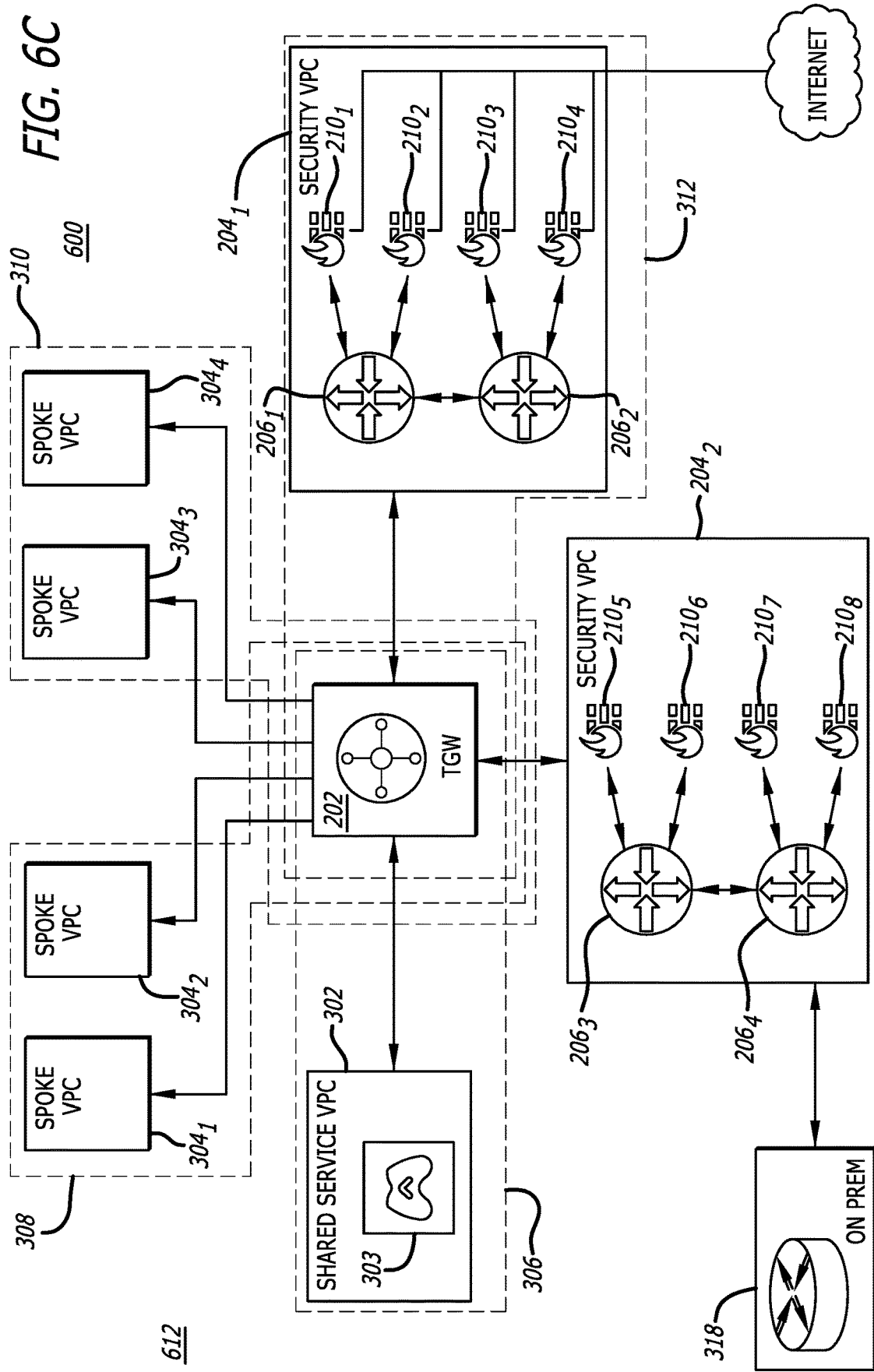

Referring now to FIGS. 6A-6C, illustrations of configurations of a transit gateway using a VPC attachment methodology to connect to one or more gateways, which in turn are coupled with a plurality of firewall instances deployed within a virtual private cloud network (VPC) are shown in accordance with some embodiments.

Referring to FIG. 6A, a diagram of an exemplary embodiment of the cloud computing environment of FIG. 3A including the use of a plurality of network tunnels connecting gateways within a transit VPC and gateways deployed at an on-premise location is shown in accordance with some embodiments. The embodiment of FIG. 6A illustrates that the firewall network architecture may utilized in combination with a transit VPC 314 that implements a plurality of network tunnels (e.g., IPSec tunnels) 604 between gateways. Specifically, the gateways $316_1$-$316_2$ and $602_1$-$602_2$ may utilize a multi-core CPU where multiple network tunnels 604 may be established between the gateways $316_1$-$316_2$ and $602_1$-$602_2$ such that all CPU cores may be used for performance scaling. Thus, the plurality of network tunnels 604 may utilize IPSec encryption while also achieving throughput speeds of 10 Gbps, 25 Gbps or more.

In some embodiments, the plurality of network tunnels 604 may represent a full-mesh network of IPSec tunnels established between the gateways $316_1$-$316_n$ (where n≥1, and n=2 in this embodiment) of the VPC 314 and routers of an on-premise network. For example, when VPC 314 has n gateways, there are p routers on-premise, there should be n×p tunnels created between the VPC 314 and on-prem components 318.

Referring to FIG. 6B, a diagram of an exemplary embodiment of a cloud computing environment including multiple regions connected using two edge VPCs is shown in accordance with some embodiments. FIG. 6B illustrates two regions $607_1$-$607_2$ within a cloud computing environment 606, where each region $607_1$-$607_2$ includes components similar to those illustrated in FIG. 3A and discussed above. For example, the region $607_1$ includes a transit gateway $202_1$, a security VPC $204_1$ that includes gateways $206_1$-$206_2$ and firewall instances $210_1$-$210_4$, a shared services VPC $306_1$ deploying a controller $303_1$ and a plurality of VPCs deployed within first and second domains (e.g., a dev domain $308_1$ and a prod domain $310_1$). Additionally, the region $607_1$ includes a spoke VPC $608_1$ that is connected to a similar spoke VPC $608_2$ within the region $607_2$, where the spoke VPCs $608_1$-$608_2$ may be referred to as "edge VPCs $608_1$-$608_2$." Each of the edge VPCs $608_1$-$608_2$ may include deployed therein one or more gateways, e.g., the gateways $610_1$-$610_2$ deployed in the edge VPC $608_1$ and the gateways $610_3$-$610_4$ deployed in the edge VPC $608_2$. The groups of gateways $610_1$-$610_2$ and $610_3$-$610_4$ may each be deployed in the active-active configuration as discussed above and illustrated in FIG. 2B.

As one example, the regions $607_1$-$607_2$ may be provided by separate cloud providers, e.g., the region $607_1$ may be provided by AMAZON WEB SERVICES® (AWS) while the region $607_2$ may be provided by MICROSOFT AZURE®. In such an example, the region provided by AMAZON WEB SERVICES® deploys VPCs while the region provided by MICROSOFT AZURE® deploys VNETs. One technical advantage that the firewall network architecture configuration illustrated in FIG. 6B includes visibility of network traffic and monitoring of network metrics of components in both regions for a network administrator or other user in a single location (e.g., provided in a dashboard).

In some embodiments, the transit gateway $202_1$ need not be directly connected to the on-prem components 318. Instead, the transit gateway $202_1$ may be indirectly connected to the on-prem components 318 through the edge VPC $608_1$, which is then connected to the on-prem components 318 as seen via connection $614_1$. It is noted that although FIG. 6B illustrates that the regions $607_1$-$607_2$ included a mirrored set of components, such is not a requirement. In fact, as reference above when different commercial cloud providers each provide a region $607_1$-$607_2$, it is unlikely the components will be mirrored between the regions $607_1$-$607_2$. Instead, one technical advantage illustrated in FIG. 6B includes the utilization of the firewall network architecture in conjunction with edge VPCs in order to allow communication between multiple regions and enable tracking of network traffic as well as of metrics for the components included within each region such that data obtained from tracking the network traffic and the metrics of the components may be displayed to an administrator in a single location (e.g., in a single dashboard). Further, the administrator may also adjust the configuration of the regions from the single dashboard. Such is not currently possible in the current state of cloud computing technology, especially when multiple commercial cloud providers provide individual regions.

Referring to FIG. 6C, a diagram of an exemplary embodiment of a cloud computing environment of FIG. 3A including multiple security VPCs is shown in accordance with some embodiments. The embodiment of FIG. 6C illustrates that the firewall network architecture may utilized to deploy multiple security VPCs $204_1$-$204_2$. Specifically, numerous components of FIG. 3A are illustrated and perform the same operations as discussed above. In addition, the cloud computing network 612 is illustrated as including a second security VPC $204_2$ deployed in between the transit gateway 202 and the on-prem components 318. More specifically, the two security VPCs $204_1$-$204_2$ are deployed in the firewall network architecture discussed above and may be utilized to inspect separate portions of network traffic associated with the cloud computing environment 612. For instance, the security VPC $204_1$ may be utilized to inspect egress traffic while the security VPC $204_2$ is utilized to inspect network traffic exchanged between spoke VPCs, and between spoke VPCs and the on-prem components 318. It is noted that additional security VPCs may be deployed, where each additional security VPC may be deployed in the firewall network architecture.

VI. Transit Firewall Network Architecture

Figure 7A:
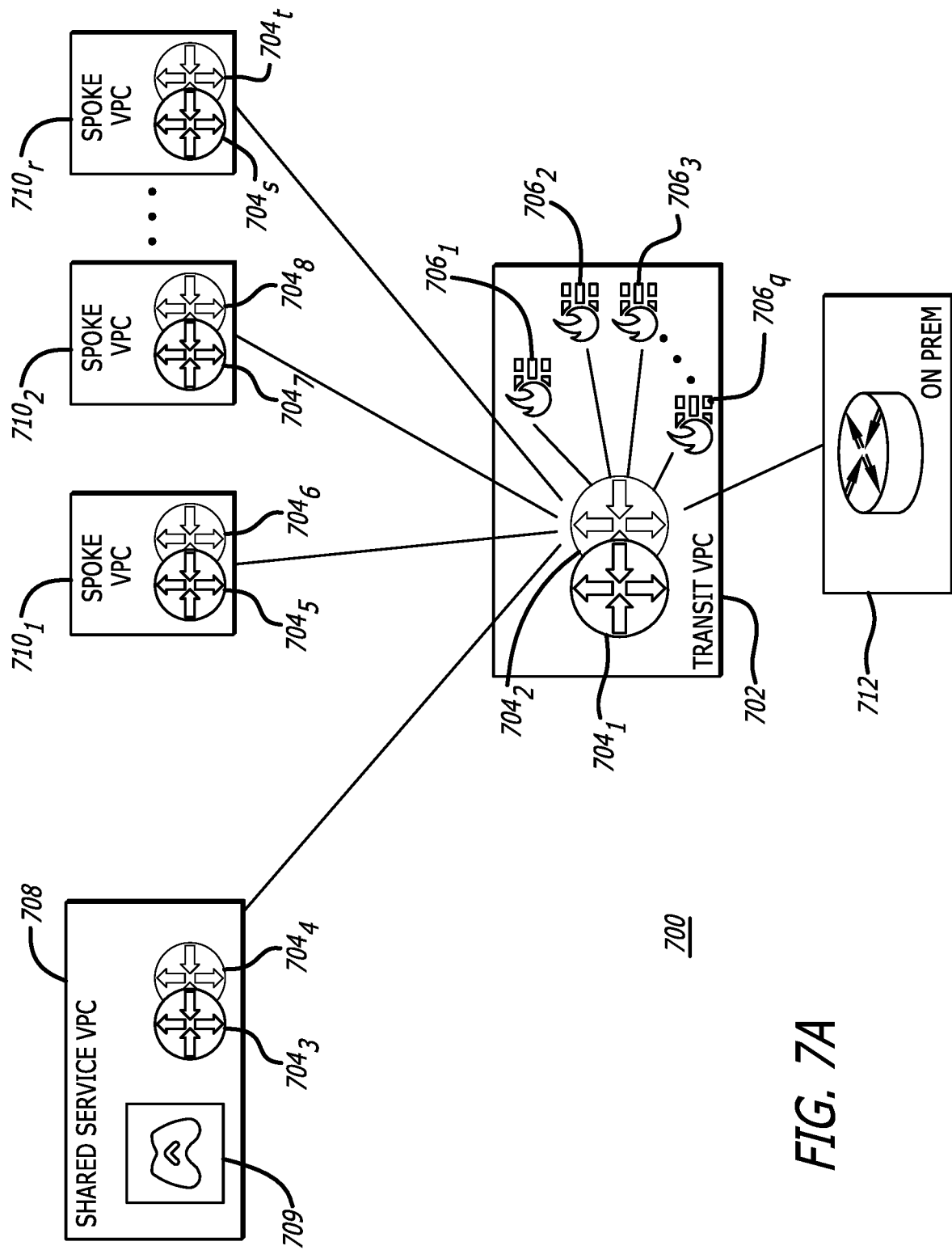
FIG. 7A is a diagram of an exemplary embodiment of a transit gateway implementing a transit firewall network architecture that utilizing a VPC attachment methodology to connect to one or more gateways, which in turn are coupled with a plurality of firewall instances deployed within a VPC in accordance with some embodiments.

Referring now to FIG. 7A, a diagram of an exemplary embodiment of a transit gateway implementing a transit firewall network architecture that utilizing a VPC attachment methodology to connect to one or more gateways, which in turn are coupled with a plurality of firewall instances deployed within a VPC is shown in accordance with some embodiments. FIG. 7A illustrates a cloud computing environment 700 that is comprised of a transit VPC 702, a shared services VPC 708, one or more spoke VPCs 710₁-710ᵣ and, optionally, a data center (or other network devices or software components) located or deployed on-prem 712 (collectively "on-prem components 712"). The transit VPC 702 includes the gateways 704₁-704₂, and coupled to a plurality of firewall instances 706₁-706_q. The shared services VPC 708 includes a controller 709 that operates in the same manner as the controller 303 discussed above, and further includes the gateways 704₁-704₂. Further, the cloud computing environment 700 includes the one or more spoke VPCs 710₁-710ᵣ that each have deployed there in a gateway pairing. As shown, the shared services VPC 708, the one or more spoke VPCs 710₁-710ᵣ are coupled to the transit VPC 702. In some embodiments, the gateway pairings 704₁-704₂, 704₃-704₄, 704₅-704₆, 704₇-704₈, 704_s-704_t are each deployed in an active-active configuration as discussed above. In some embodiments, the transit VPC 702 may be connected to the on-prem components 712 in a similar manner as discussed above with respect to FIG. 3A.

As illustrated in FIG. 7A, each spoke VPC has deployed there in a pairing of gateways, which differs from the firewall network architecture and the corresponding cloud computing environment illustrated above in at least FIGS. 3A-3C. The transit VPC 702 acts as the security VPC 204 of FIG. 2A in which it receives network traffic packet flows (east-west traffic, north-south traffic and ingress/egress traffic) and the gateways 704₁-704₂ provide the packet flows to a firewall instance 706₁-706_q for inspection. However, the transit firewall network architecture of FIG. 7A differs from that of the firewall network architecture in that a transit gateway is not required to route packet flows from an originating spoke VPC to the security VPC for inspection and then to the destination VPC. Instead, the gateways 704₃-704₁ deployed within the spoke VPCs 710₁-710ᵣ connect directly to the gateways 704₁-704₂.

Although the gateways 7041-704t are each deployed as having four Ethernet interfaces (as shown in FIG. 2B), not all Ethernet interfaces need to be not utilized. In the embodiment of FIG. 7A, the gateways 7043-704t connect directly to the gateways 7041-7042 via the eth0 interface. Further, the gateways 7041-7042 are directly connected via the eth3 interface. As a result, there are several technical advantages providing by the transit firewall architecture over the current technology of FIGS. 1A-1B. As one technical advantage, the packet flows routed between the gateways 7041-704t may be encrypted the gateways will perform encryption prior to transmission. In contrast, transmission of packet flows from a spoke VPC to a transit gateway may not be encrypted as typical spoke VPCs utilize native transmission protocols, which do not encrypt the network traffic. Further, the same technical advantages over the current technology of FIGS. 1A-1B that are provided by the firewall network architecture discussed above, e.g., scaling and throughput advantages, are equally applicable with respect to the transit firewall network architecture.

More specifically with respect to the packet flow differences between the firewall network architecture and the transit firewall network architecture, in contrast to the packet flow as discussed above with the firewall network architecture and illustrated in FIGS. 3B-3C in which a packet flow is routed from a spoke VPC to a transit gateway that routes the packet flow to a gateway deployed within a security VPC, where the gateway provides the packet flow to a firewall instance for inspection and the packet flow is routed back to the gateway and the transit gateway, which ultimately routes the inspected packet flow to a destination spoke VPC, the packet flow through the transit firewall network architecture of FIG. 7A includes a gateway within a spoke VPC routing the packet flow a gateway within a transit VPC, which in turn provides the packet flow to a firewall instance for inspection. In the transit firewall network architecture of FIG. 7A, the inspected packet flow may, in one embodiment, be routed back to the gateway within the transit VPC, which routes the inspected packet flow to a gateway within the destination spoke VPC. However, in a second embodiment, the firewall instance may, following inspection, routed the inspected packet flow directly to a gateway of the destination spoke VPC.

In some embodiments, when the transit firewall network architecture is deployed using VNETs instead of VPCs, a limitation on the number of firewall instances deployed with a single VPC (e.g., the transit VPC 702) may exist limiting the number to two. However, in other embodiments, there may be no limitation on the number of firewall instances deployed with a single VPC (e.g., the transit VPC 702).

Although not illustrated in FIG. 7A, the concept of domains as illustrated in at least FIGS. 3A-3C and the firewall network architecture may be implemented by the controller 709 with respect to the transit firewall network architecture shown in FIG. 7A. As should be understood, domains may be defined dynamically or be pre-configured and be implemented by the controller 709. Specifically, a domain may be defined and implemented to include one or more VPCs such that policies may be applied to network traffic associated with the domain in the same manner as discussed above. In the case of domains implemented within the transit firewall network architecture, the controller 709 may alter one or more route tables of the gateways 704₁-704₂ such that network traffic may be provided to a firewall instance 706₁-706_q for inspection or directly to a destination spoke VPC depending on the established domains and corresponding policies.

Figure 7B:
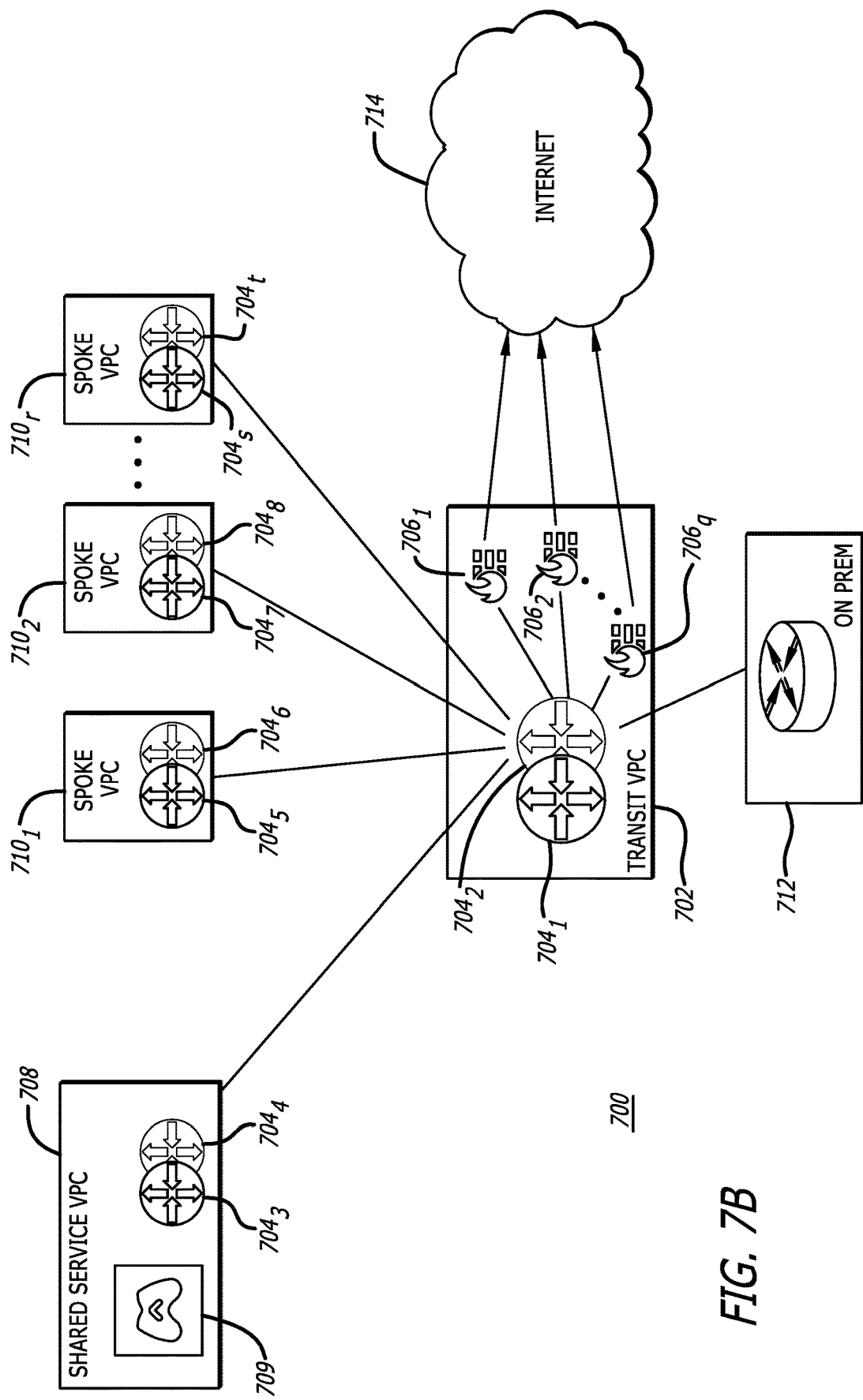
FIG. 7B is an illustration of a configuration of the diagram of FIG. 7A for egress data inspection in accordance with some embodiments.

Referring to FIG. 7B, an illustration of a configuration of the diagram of FIG. 7A for egress data inspection is shown in accordance with some embodiments. FIG. 7B utilizes the components of the cloud computing environment 700 of FIG. 7A and additionally illustrates that the transit VPC 702 may be utilized to inspect egress traffic through the gateways 704₁-704₂ and the firewall instances 706₁-706_q. Thus, in addition to inspecting east-west traffic (e.g., spoke VPC to spoke VPC) and north-south (e.g., between spoke VPC and on-prem components 712), the firewall instances 706₁-706_q may inspect internet-bound network traffic, which, following inspection, may be routed to the internet 714 (or another public network) via an internet gateway (not shown).

Figure 7C:
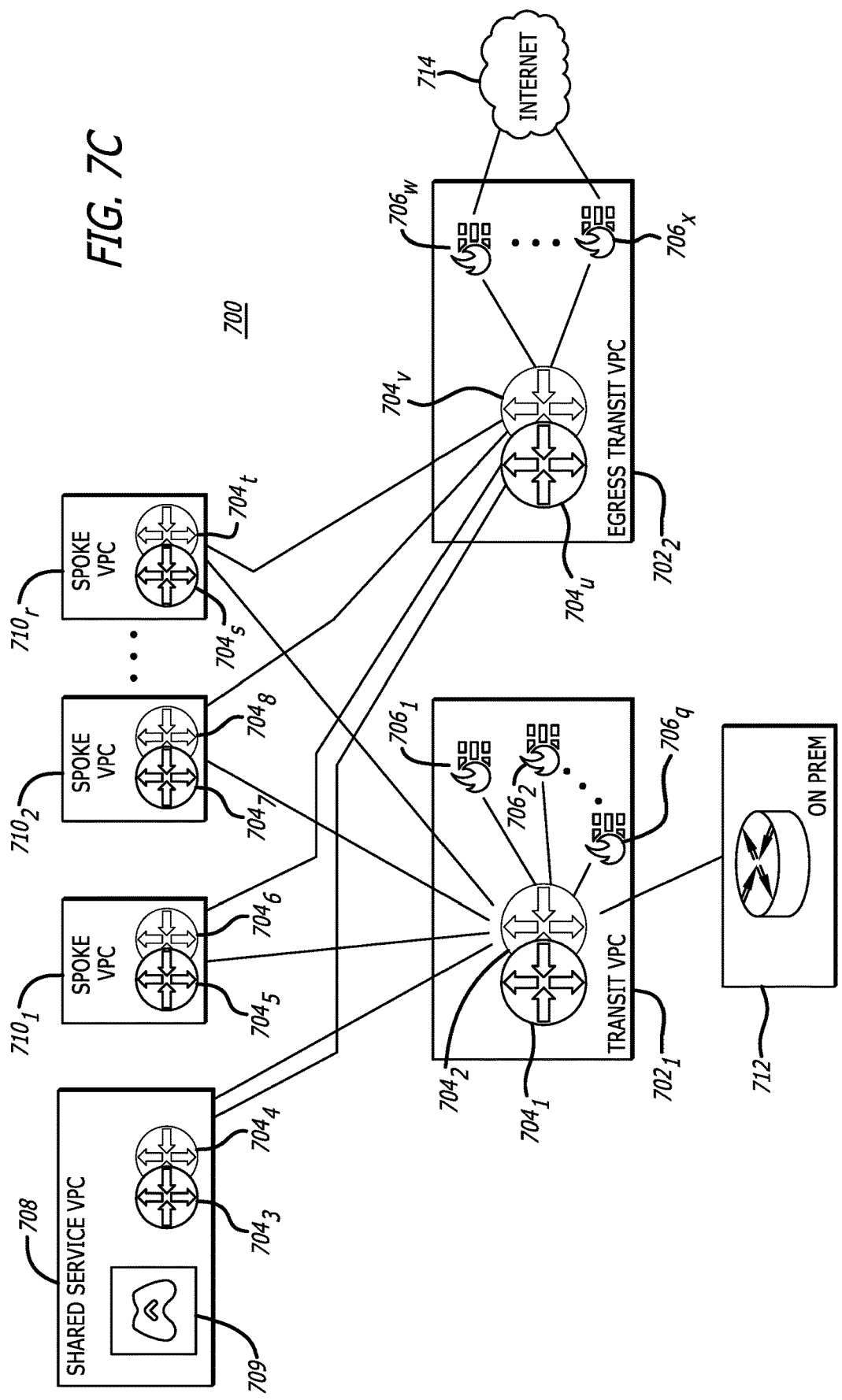
FIG. 7C is an illustration of a configuration of the diagram of FIG. 7A utilizing a second transit gateway for egress data inspection in accordance with some embodiments.

Additionally, referring to FIG. 7C, an illustration of a configuration of the diagram of FIG. 7A utilizing a second transit gateway for egress data inspection is shown in accordance with some embodiments. FIG. 7C illustrates that the cloud computing environment 700 may include multiple transit VPCs deployed using the transit firewall network architecture. Specifically, FIG. 7C includes the transit VPCs 702₁-702₂, where the transit VPC 702₁ inspects east-west traffic and north-south traffic while the transit VPC 702₂ inspects egress traffic using the gateways 704_u-704_v ("egress gateways") and the firewall instances 706_w-706_x.

VII. Operational Flow—Transit Firewall Network Architecture

Figure 8:
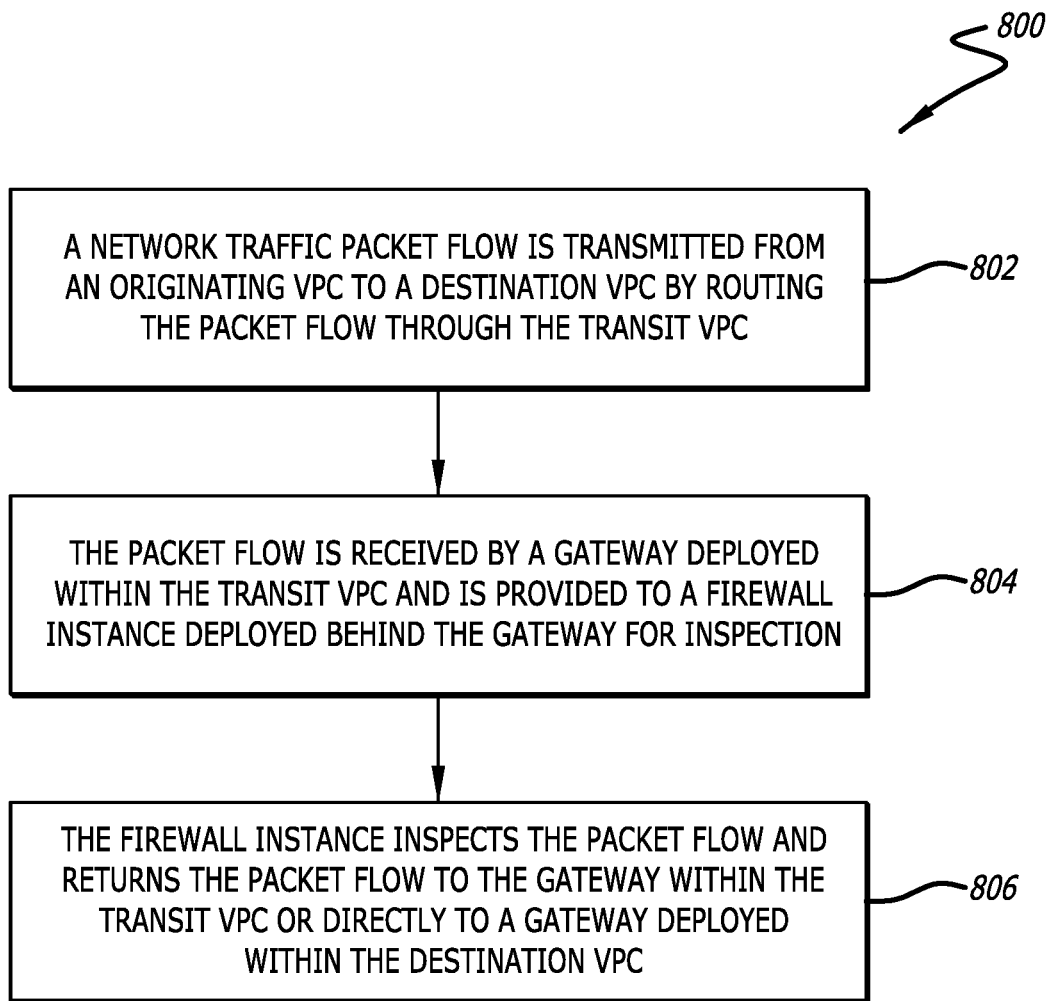
FIG. 8 is a flowchart of a method of operability of the architecture of FIG. 7A in accordance with some embodiments.

Referring now to FIG. 8, a flowchart of a method of operability of the transit firewall network architecture of FIG. 7A is shown in accordance with some embodiments. Each block illustrated in FIG. 8 represents an operation performed in the method 800 of routing a network traffic packet flow through a cloud computing environment deploying a security VPC using the transit firewall network architecture of FIG. 7A. Prior to the start of operations comprising the method 800, it is assumed that a cloud computing environment, such as the cloud computing environment 700 of FIG. 7A, is operationally functioning, e.g., a transit VPC, a controller, and one or more VPCs each deploying one or more gateways (managed by the controller) have been launched. In particular, it is assumed that the transit VPC and at least one of the VPCs are configured in accordance with the transit firewall network architecture of FIG. 7A in which a gateway within the transit VPC connects to a gateway within the spoke VPC over a specified ethernet interface of each gateway and further that one or more firewall instances are deployed behind each gateway within the transit VPC to operate to inspect network traffic associated with the cloud computing environment.

The method 800 begins when transmission of a network traffic packet flow is initiated from an originating VPC to a destination VPC by routing the packet flow through the transit VPC (block 802). For example, with reference to FIG. 7A, transmission of a packet flow may originate from the VPC $710_1$ with a destination of the VPC $710_2$, where in this example, a policy has been established and is being implemented by the controller 709 that east-west traffic between VPC $710_1$-VPC $710_2$ is to be inspected prior to routing to the destination VPC.

The packet flow is received by a gateway deployed within the transit VPC and is provided to a firewall instances deployed behind the gateway for inspection (block 804). In particular, the transit VPC may be represented by the transit VPC 702, which includes the gateways $704_1$-$704_2$ and firewall instances $706_1$-$706_q$ deployed behind the gateways $704_1$-$704_2$.

The firewall instance inspects the packet flow and returns the inspected packet flow to either the gateway within the transit VPC or directly routes the inspected packet flow to a gateway deployed within the destination VPC (block 806). In particular, embodiments in which the firewall instance routes the inspected packet flow directly to a gateway deployed within the destination VPC, the components deployed using the transit firewall architecture provide the technical advantage of efficiency (use of less process and transmission of data) as such embodiments avoid transmitting the packet to a gateway within the transit VPC twice.

Figure 9:
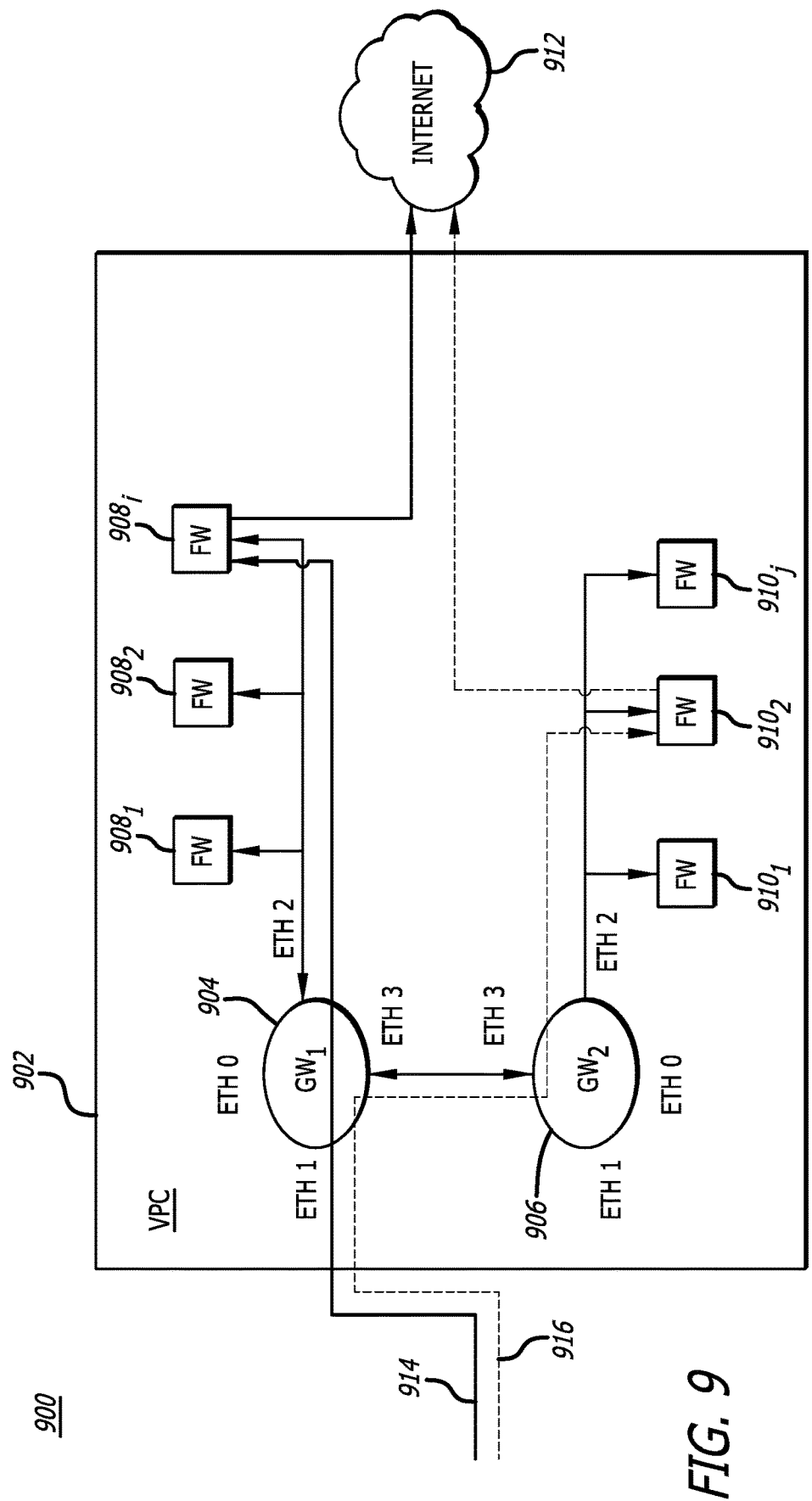
FIG. 9 is a diagram illustrating the flow of two egress network traffic sessions through an exemplary embodiment of a security VPC deploying two gateways in accordance with some embodiments.

Referring now to FIG. 9, a diagram illustrating the flow of two egress network traffic sessions through an exemplary embodiment of a security VPC deploying two gateways is shown in accordance with some embodiments. FIG. 9 may illustrate a security VPC, such as the security VPC 204 of FIG. 2A, or a transit VPC, such as the transit VPC 702 of FIG. 7A. Specifically, FIG. 2B illustrates that each $206_1$-$206_2$ includes a plurality of interfaces, which may encompass both public and private interfaces. Referring to the gateway 904, four interfaces are shown including a management interface (eth0), a transit gateway interface (eth1), a firewall instance interface (eth2) and a high-availability (HA) gateway interface (eth3). In some embodiments, eth0 may be public interface while eth1-eth3 are private interfaces. In some embodiments, network traffic received over eth1 is network traffic transmitted from a transit gateway (such as an AWS transit gateway) while network traffic received over eth0 indicates network traffic transmitted via the internet or from a transit VPC.

FIG. 9 illustrates that the gateway 904 and the gateway 906 are directly connected via eth3, which enables a "high availability" configuration (or "active-active" configuration) in which both gateways 904-906 may actively receive network traffic. As shown, network traffic session flows 914-916 are received by the gateway 904 at either eth0 or eth1 and directed accordingly. For instance, FIG. 9 may indicate that a TCP packet belonging to the network traffic session flow 914 is directed to the firewall $908_i$ upon receipt. Further illustrated, for example, is that a second TCP packet belonging to the network traffic session flow 916 is directed to the gateway 906 via eth3 and subsequently to the firewall $910_2$ upon receipt. Following inspection by the relevant firewall, both TCP packets are transmitted to a destination via the internet 912.

As will be discussed below, various load balancing methodologies may be implemented by a gateway receiving network traffic, i.e., the gateway 904 in FIG. 9. Specifically, the implemented load balancing methodology may depend on the computing entity (e.g., a spoke gateway, a transit gateway, or a peer gateway) from which the network traffic was received and the type of network traffic (e.g., a Transmission Control Protocol (TCP) packet compared to a User Datagram Protocol (UDP) packet). At a high level of abstraction, the implemented load balancing methodology may seek to determine whether the network traffic belongs to a network traffic session currently being handled (e.g., inspected) by an available firewall. In such an instance, the received network traffic is passed to the relevant firewall. However, when the network traffic does not belong to a network traffic session currently being handled by an available firewall, the receiving gateway instance (also referred to herein as "receiving gateway") determines whether to select a firewall connect to itself (a "local" firewall) or provide the network traffic to its peer gateway for selection of a firewall connected to the peer gateway (a "peer" firewall).

Figure 10:
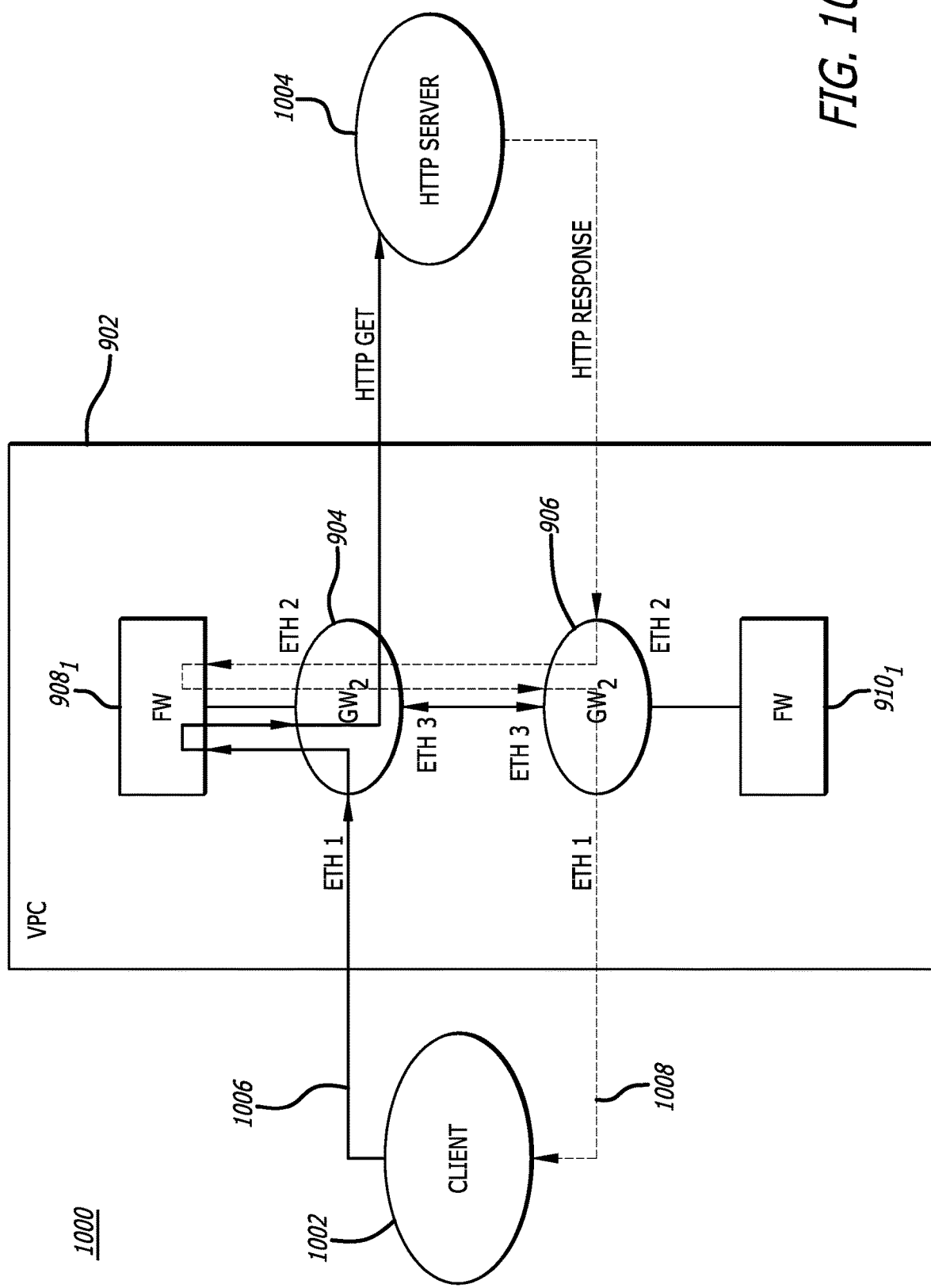
FIG. 10 is a diagram illustrating the flow of two network traffic sessions through an exemplary embodiment of a security VPC deploying two gateways in accordance with some embodiments.

Referring to FIG. 10, a diagram illustrating the flow of two network traffic sessions through an exemplary embodiment of a security VPC deploying two gateways is shown in accordance with some embodiments. FIG. 10 illustrates the VPC 902 of FIG. 9 and a subset of the attached firewalls for purposes of clarity. Additionally, instead of showing egress traffic to the internet 912, FIG. 10 illustrates transmission of network traffic between a client 1002 and a server 1004, e.g., a Hypertext Transfer Protocol (HTTP) server, via the VPC 902. Specifically, FIG. 10 illustrates asymmetric traffic comprising (1) a HTTP GET request 1006 sent from the client 1002 to the HTTP server 1004 through the gateway 904 and (2) a HTTP response 1008 transmitted from the HTTP server 1004 to the client 1002 through the gateway 906. Although the network traffic is asymmetric (e.g., handled by different gateways), the network traffic is inspected by the same firewall, e.g., the firewall $908_1$; thus, ensuring proper and comprehensive inspection. This is so due to a TCP session being established between the client 1002 and the server 1004 such that a single firewall, e.g., the firewall $908_1$, must inspect flowing in either direction between the client 1002 and the server 1004. For example, in the event that the HTTP response 1008 is not inspected by the firewall $908_1$, the firewall $908_1$ will not permit additional traffic between the client 1002 and the server 1004. It should be understood that the eth0 interface is not shown in FIG. 10 for purposes of clarity.

The following methods of FIGS. 11-14 each disclose a method of directing transmission of a data packet, e.g., a layer 4 (Transport Layer) protocol packet, and implementing load balancing, when applicable. Generally, the methods disclosed apply to directing transmission of either a Transmission Control Protocol (TCP) packet or a User Datagram Protocol (UDP) packet, where the method occurs at a gateway within a security VPC (such as those discussed above). Referring now to FIG. 11, a flowchart of a method of directing transmission of a Transmission Control Protocol (TCP) packet received from a spoke or transit gateway and implementing load balancing at a gateway within a security VPC is shown in accordance with some embodiments. Each block illustrated in FIG. 11 represents an operation performed in the method 1100 of implementing a load balancing methodology while routing a TCP packet within a network traffic packet flow through a cloud computing environment deploying a security VPC using either the firewall network architecture of FIGS. 2A-3A or the transit firewall network architecture of FIG. 7A.

Prior to the start of operations comprising the method 1100, it may be assumed that a cloud computing environment, such as the cloud computing environment 300, is operationally functioning, e.g., a controller, one or more spoke VPCs each deploying one or more gateways (managed by the controller), a security VPC deploying at least two gateways deployed in an active-active configuration and a transit gateway have been launched. As an alternative embodiment, prior to the start of operations comprising the method 1100, it may be assumed that a cloud computing environment, such as the cloud computing environment 700, is operationally functioning, e.g., a controller, one or more spoke VPCs each deploying one or more gateways (managed by the controller) and a transit VPC deploying at least two gateways deployed in an active-active configuration have been launched.

The method 1100 begins when a TCP packet is received, by a first gateway ("receiving gateway") deployed within either the security VPC or the transit VPC, from a spoke or transit gateway (block 1102). The following discussion of the method 1100 will refer to first and second gateways (or "receiving" and "peer" gateways) without distinguishing between deployment in the security VPC or the transit VPC as implementation of the load balancing methodology will not differ.

Upon receipt of the TCP packet, the receiving gateway performs a session lookup operation (block 1104). In some embodiments, a 5 tuple of Protocol, Source IP, Destination IP, Source Port, Destination Port. Additionally, a firewall identifier (ID) may be saved as part of the session. Thus, a hash of the session may refer to a hash of the 5 tuples above, or may refer to a hash of the 5 tuples and a firewall ID (the term "session" may also refer to a hash of the 5 tuples, or alternative may merely refer to a destination address of a data packet). When the session lookup operation returns a match (e.g., "success"), the receiving gateway determines the next destination of the TCP packet in the packet's transmission path, either to a firewall attached to the receiving gateway or to the receiving gateway's peer gateway (block 1106). For instance, when the session lookup operation indicates that a firewall attached to the receiving gateway is handling inspection of the network traffic session to which the TCP packet belongs, the receiving gateway forwards the TCP packet to the identified firewall. Alternatively, when the session lookup operation indicates that a firewall attached to the peer gateway is handling inspection of the network traffic session to which the TCP packet belongs, the receiving gateway forwards the TCP packet to the peer gateway. The method then performed by the peer gateway is discussed below with respect to FIGS. 12A-12B.

When the session lookup operation does not return a match (e.g., "fail"), the receiving gateway determines that inspection of the network traffic session to which the TCP packet belongs is not currently being handled by any of the firewalls attached to either the peer gateway ("peer firewalls") or attached to itself ("local firewalls") and subsequently determines whether a peer or local firewall is available to handle inspection of the received TCP packet (block 1108). In the event that neither a peer nor a local firewall is available, the packet is dropped (1110).

When a firewall is available to handle inspection, in one embodiment, the receiving gateway determines whether a peer firewall is available (block 1112). For example, the controller maintains a listing of available firewalls for each gateway and informs the receiving gateway and its peer gateway of each other's available firewalls. Further, when a peer firewall is available, the receiving gateway determines whether the TCP packet is a synchronize packet ("SYN" packet) (block 1114). As is understood, a SYN packet is a synchronize packet generated upon a desire to establish a TCP connection, meaning the received TCP packet is the initial packet of a network traffic session. When the received TCP packet is not a SYN packet, the receiving gateway creates a forwarding session and forwards the TCP packet to the next destination in the packet's transmission path, e.g., in this instance the receiving gateway's peer gateway (block 1106). For example, the corresponding 5 tuples may be stored in the session table, and the peer gateway is designated as the "next hop." The storage of the 5 tuples may be a hash thereof.

When the TCP packet is a SYN packet (yes at block 1114), the receiving gateway determines whether a local firewall is available (block 1118). In particular, the receiving gateway stores a listing of the IP address of each available local firewall and constantly monitors the health of the firewall (e.g., via receipt of responses to pings transmitted to the firewall). When a local firewall is not available, the receiving gateway creates a forwarding session and forwards the TCP packet to the next destination in the packet's transmission path, e.g., in this instance the receiving gateway's peer gateway (blocks 1116 and 1106). However, when a local firewall is available to handle inspection (yes at block 1118), the local firewall is utilized, a firewall session is created, a local firewall is selected via round-robin computation, a hash of the firewall session is generated and logged to storage along with an indication of the selected local firewall (blocks 1120-1124).

In some embodiments, load-balancing operations may be performed to determine which available local firewall is to handle the inspection based on information derived from the 5-tuple (or 2-tuple in some cases). In some embodiments in which it is assumed that general network traffic is uniformly distributed, the network load is load-balanced to evenly distribute the traffic inspect to all available firewalls. It should be understood that, throughout the disclosure, selection via round-robin computation is merely one example. Other examples of load-balancing computations include a least sessions analysis (where the firewall inspecting the least number of sessions is selected) or use of a random number generator to select a firewall.

Finally, the TCP packet is forwarded to the next destination in the packet's transmission path, e.g., in this instance the selected local firewall (block 1106). When a peer firewall is not available (no at block 1112), the method 1100 proceeds to block 1118 as discussed above.

Figure 12A:
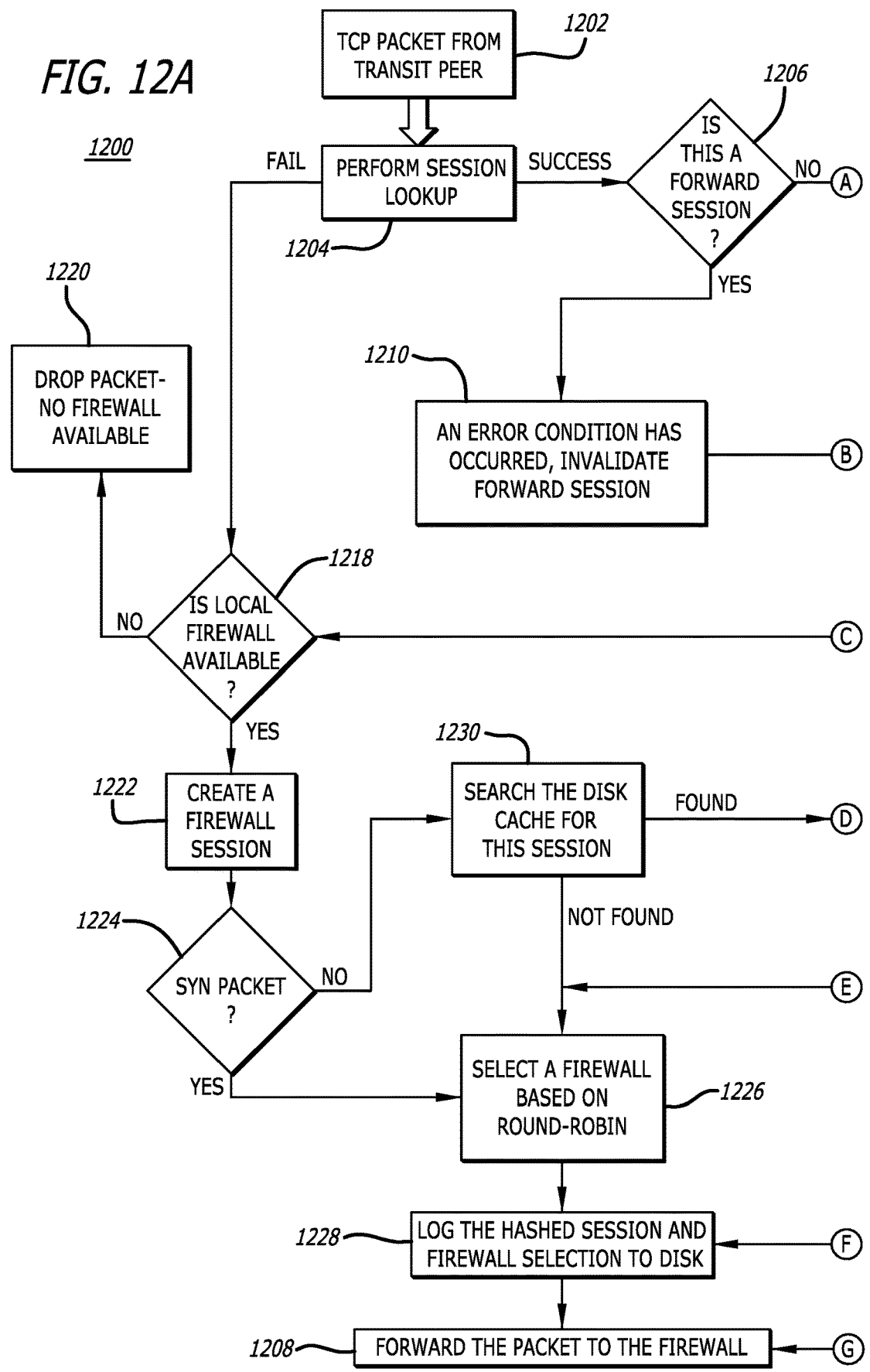
FIGS. 12A-12B illustrate a flowchart of a method of directing transmission of a TCP packet from a peer gateway and implementing load balancing at a gateway within a security VPC in accordance with some embodiments.
Figure 12B:
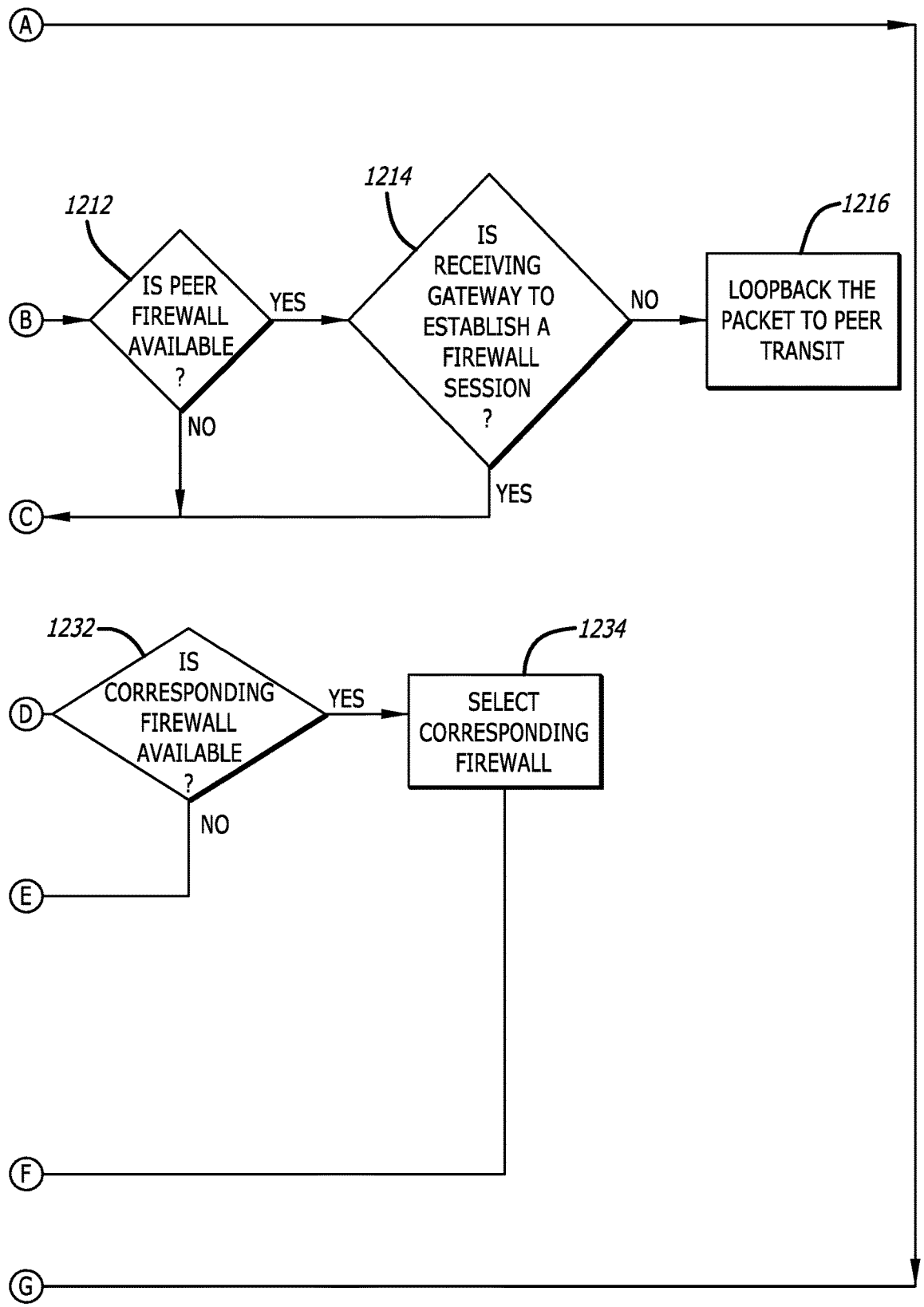

Referring to FIGS. 12A-12B, a flowchart of a method of directing transmission of a TCP packet from a peer gateway and implementing load balancing at a gateway within a security VPC is shown in accordance with some embodiments. Each block illustrated in FIGS. 12A-12B represents an operation performed in the method 1200 of implementing a load balancing methodology while routing a TCP packet within a network traffic packet flow through a cloud computing environment deploying a security VPC using either the firewall network architecture of FIGS. 2A-3A or the transit firewall network architecture of FIG. 7A.

Prior to the start of operations comprising the method 1200, the same assumptions discussed with respect to the method 1100 apply equally. Thus, the method 1200 begins when a TCP packet is received, by a first gateway ("receiving gateway") deployed within either the security VPC or the transit VPC, from a peer gateway (block 1202). As with the method 1100, the following discussion of the method 1200 will refer to first and second gateways (or "receiving" and "peer" gateways) without distinguishing between deployment in the security VPC or the transit VPC as implementation of the load balancing methodology will not differ.

Upon receipt of the TCP packet, the receiving gateway performs a session lookup operation, as described above (block 1204). When the session lookup operation returns a match (e.g., "success"), the receiving gateway determines whether the TCP packet is a forward session, e.g., a session to be forwarded to the peer gateway (block 1206). When the session is a forwarding session (also referred to herein as a "forwarding session-type" session), an error is determined to have occurred (block 1210). Specifically, as the TCP packet was received from the peer gateway and is also indicated as a forward session, a looping situation will occur in which the TCP packet will continually be sent back and forth between gateways. Thus, to remedy the situation, the session is invalidated (block 1210). Following invalidation of the forward session, the receiving gateway determines whether a peer firewall is available (block 1212). When a peer firewall is available, the receiving gateway determines whether it is to establish a firewall session (also referred to as a determination as to whether the receiving gateway "wins" the right to create the firewall session) (block 1214). There are a plurality of methods for determining whether the receiving gateway has won the right to create the firewall session. One example includes comparing the IP address of the eth3 interface the receiving gateway against the IP address of the eth3 interface the peer gateway. The value between the IP addresses may be considered the winner (or alternatively, the lower value). When the receiving gateway is not to establish a firewall session, the TCP packet is transmitted back to the peer gateway (block 1216). When either a peer firewall is not available (no at block 1212) or the receiving gateway is to establish a firewall session (yes at block 1214), the receiving gateway determines whether a local firewall is available (block 1218). When a local gateway is not available, the packet is dropped (block 1220).

When a local firewall is available, a firewall session is created (block 1222) and a determination as to whether the TCP packet is a SYN packet, as discussed above (block 1224). When the TCP packet is a SYN packet, a local firewall is selected via round-robin computation, a hash of the firewall session is generated and logged to storage along with an indication of the selected local firewall (blocks 1226-1228). The TCP packet is then forwarded to the selected firewall (block 1208). When the TCP packet is not a SYN packet, the receiving gateway searches the disk cache for the session (e.g., queries storage using the session hash to determine whether a local firewall previously inspected the network traffic session to which the TCP packet belongs) (block 1230). When the session is not found on disk cache (no at block 1230), the method 1200 proceeds to block 1226 discussed above. Alternatively, when searching of the disk cache returns a local firewall, the receiving gateway determines whether that firewall is available (block 1232). When the firewall is available, the receiving gateway selects the relevant firewall (block 1234), logs the session hash to storage along with an indication of the selected local firewall (block 1228) and forwards the TCP packet to the selected firewall (block 1208).

When the firewall is not available, the method 1200 proceeds to block 1226 discussed above. When the session lookup operation does not return a match (e.g., "fail"), the method 1200 proceeds to block 1218 discussed above.

Figure 13:
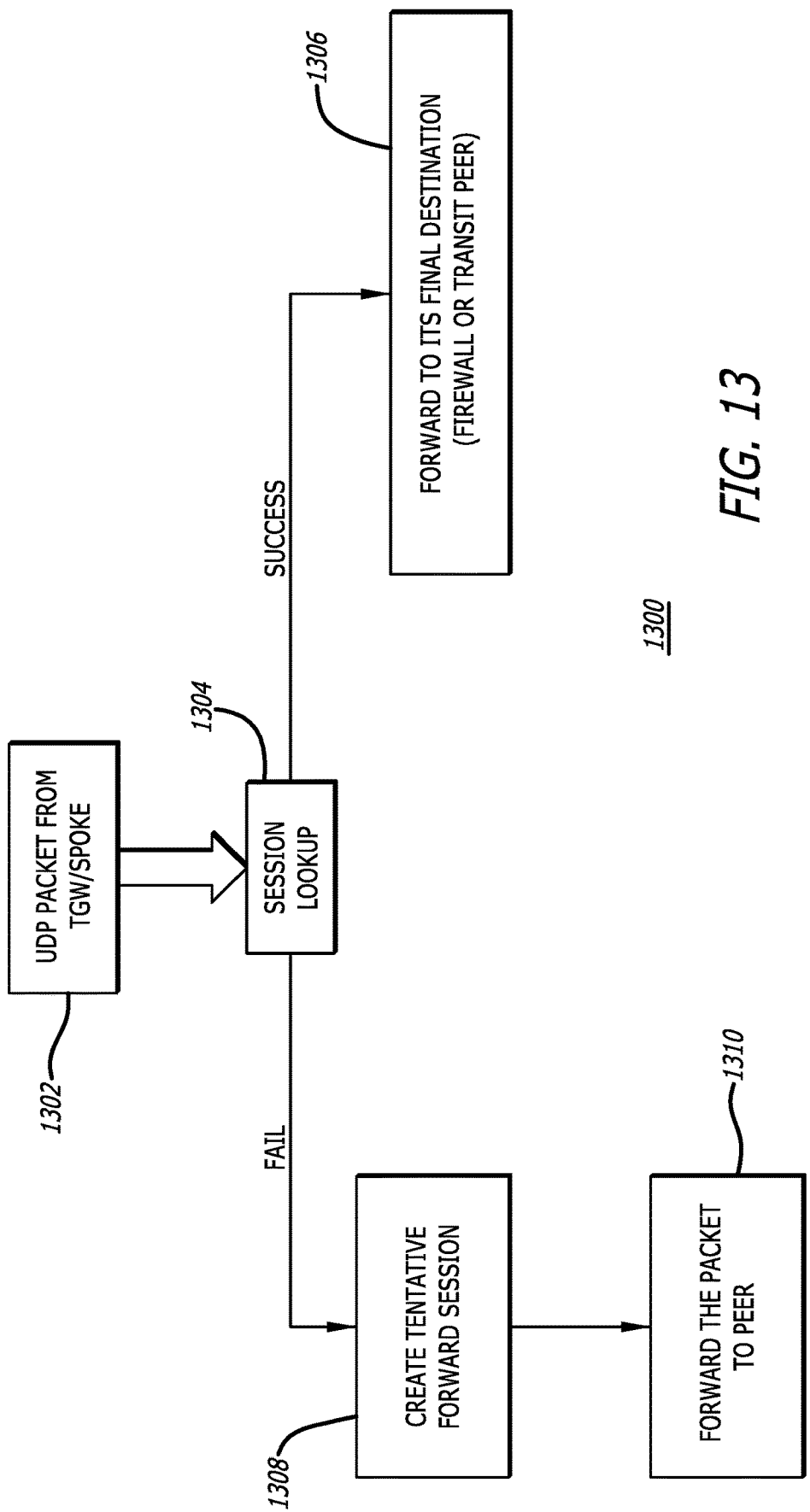
FIG. 13 is a flowchart of a method of directing transmission of a User Datagram Protocol (UDP) packet received from a spoke or transit gateway and implementing load balancing at a gateway within a security VPC in accordance with some embodiments.

Referring to FIG. 13, a flowchart of a method of directing transmission of a User Datagram Protocol (UDP) packet received from a spoke or transit gateway and implementing load balancing at a gateway within a security VPC is shown in accordance with some embodiments. Each block illustrated in FIG. 13 represents an operation performed in the method 1300 of implementing a load balancing methodology while routing a UDP packet within a network traffic packet flow through a cloud computing environment deploying a security VPC using either the firewall network architecture of FIGS. 2A-3A or the transit firewall network architecture of FIG. 7A.

Prior to the start of operations comprising the method 1300, the same assumptions discussed with respect to the methods 1100-1200 apply equally. Thus, the method 1300 begins when a UDP packet is received, by a first gateway ("receiving gateway") deployed within either the security VPC or the transit VPC, from a spoke or transit gateway (block 1302). As with the methods 1100-1200, the following discussion of the method 1300 will refer to first and second gateways (or "receiving" and "peer" gateways) without distinguishing between deployment in the security VPC or the transit VPC as implementation of the load balancing methodology will not differ.

Upon receipt of the UDP packet, the receiving gateway performs a session lookup operation (block 1304). When the session lookup operation returns a match (e.g., "success"), the receiving gateway determines the next destination of the UDP packet in the packet's transmission path, either to a firewall attached to the receiving gateway or to the receiving gateway's peer gateway (block 1306). However, when the session lookup operation does not return a match (e.g., "fail"), the receiving gateway creates a forward session and forwards the UDP packet to its peer gateway, discussed below with respect to FIGS. 14A-14B (blocks 1308-1310).

Figure 14A:
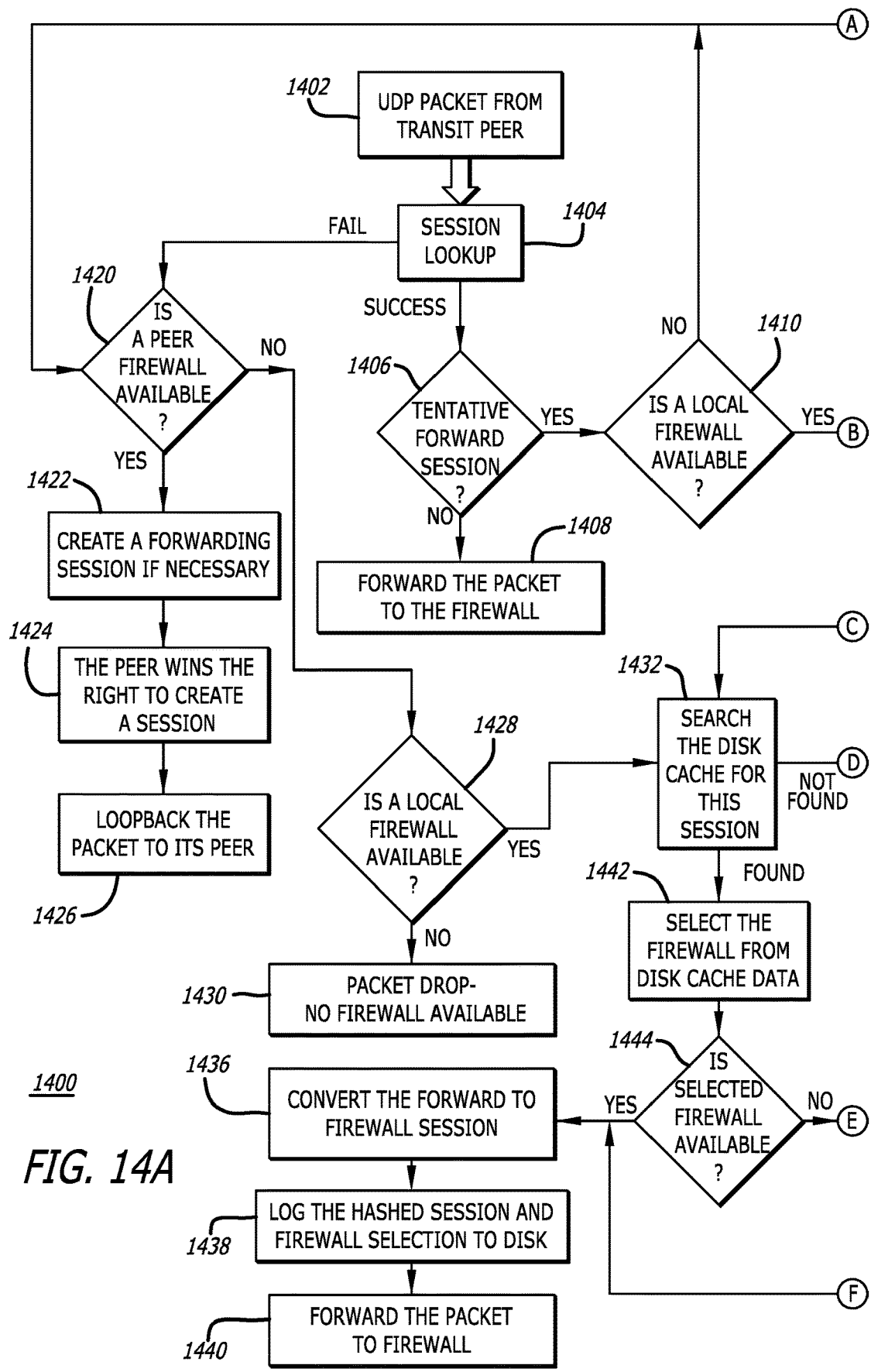
FIGS. 14A-14B illustrate a flowchart of a method of directing transmission of a UDP packet received from a spoke or transit gateway and implementing load balancing at a gateway within a security VPC in accordance with some embodiments.
Figure 14B:
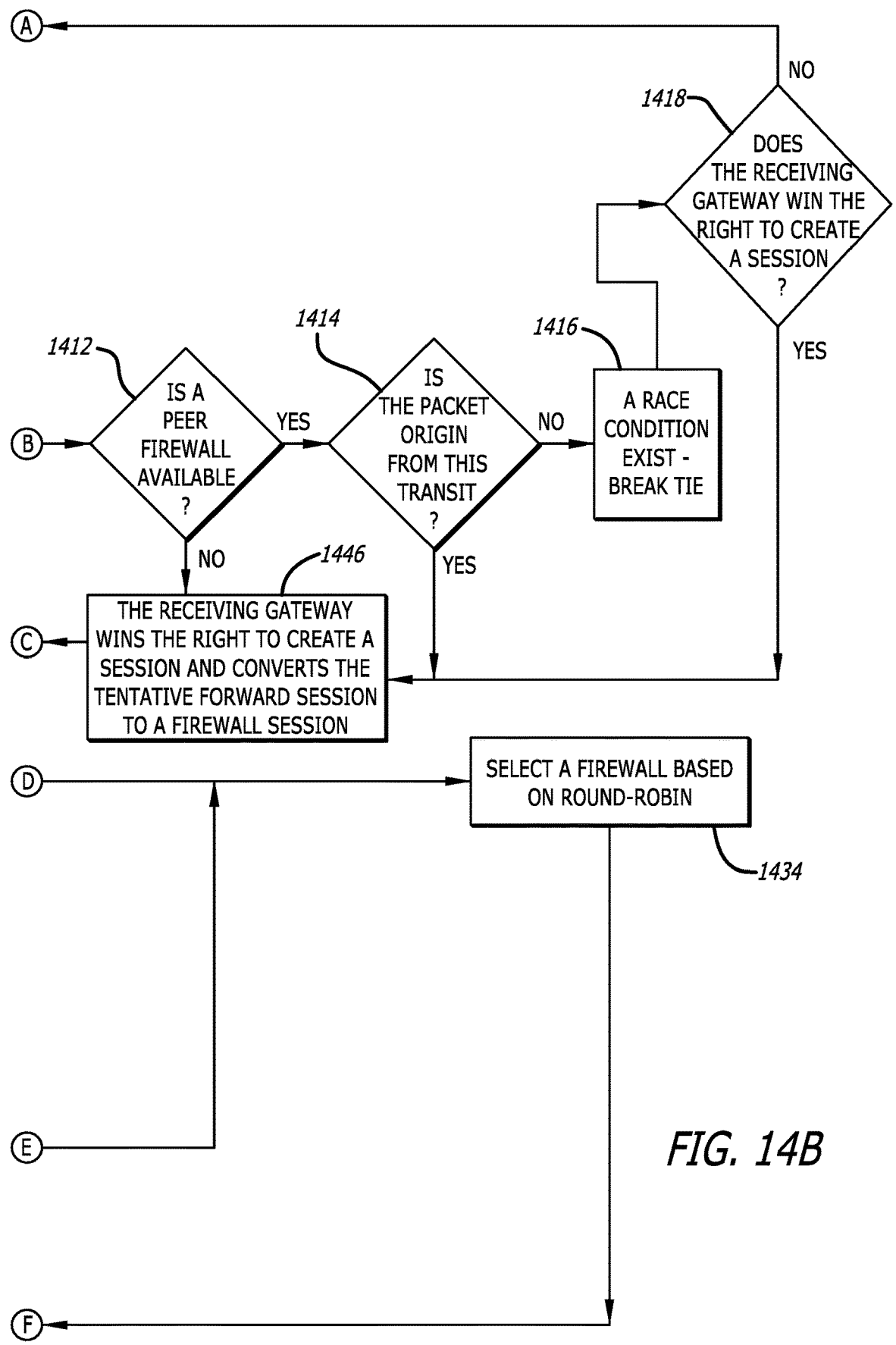

Referring now to FIGS. 14A-14B, a flowchart of a method of directing transmission of a UDP packet received from a spoke or transit gateway and implementing load balancing at a gateway within a security VPC is shown in accordance with some embodiments. Each block illustrated in FIGS. 14A-14B represents an operation performed in the method 1400 of implementing a load balancing methodology while routing a UDP packet within a network traffic packet flow through a cloud computing environment deploying a security VPC using either the firewall network architecture of FIGS. 2A-3A or the transit firewall network architecture of FIG. 7A.

Prior to the start of operations comprising the method 1400, the same assumptions discussed with respect to the methods 1100-1300 apply equally. Thus, the method 1400 begins when a UDP packet is received, by a first gateway ("receiving gateway") deployed within either the security VPC or the transit VPC, from a peer gateway (block 1402). As with the methods 1100-1300, the following discussion of the method 1400 will refer to first and second gateways (or "receiving" and "peer" gateways) without distinguishing between deployment in the security VPC or the transit VPC as implementation of the load balancing methodology will not differ.

Upon receipt of the UDP packet, the receiving gateway performs a session lookup operation (block 1404). When the session lookup operation returns a match (e.g., "success"), the receiving gateway determines whether the session is a forward session (block 1406), and when the session is not a forward session, the receiving gateway forwards the UDP packet to the local firewall indicated in the result of the session lookup operation (block 1408).

When the session is a tentative forward session, the receiving gateway determines whether a local firewall is available (block 1410), and when available, the receiving gateway determines whether a peer firewall is also available (block 1412). When both of a local firewall and a peer firewall are available (yes at block 1412), the receiving gateway determines whether the receiving gateway is also the originating gateway (e.g., the origin), wherein the origin of a packet is discussed below (block 1414). When the receiving packet is the origin of the packet (meaning it has received its own packet back from the peer gateway), the receiving gateway "wins" the right to create a session and converts the tentative session to a firewall session (block 1446). For instance, such a determination may include comparing a source IP address with the session's source IP address and determining which gateway matches the direction of the flow of the network traffic. A "tentative" session may be understood as including the same information of a session; however, such may include a designation as "tentative" (temporarily, or the like) that indicates to the peer gateway instance the receiving gateway did not find a corresponding session. In some embodiments, the designation corresponds to the packet forward destination being set to the peer gateway, which may be amended to a particular firewall based on operations illustrated in any of FIGS. 11-14B.

When the origin of the UDP packet is not from the receiving gateway, it is determined that a race condition exists such that both the receiving gateway and the peer gateway have received packets from the same network traffic session at the same time (e.g., one from a client and one from a server, as would occur in the configuration illustrated in FIG. 10). Thus, the IP address of the gateway's eth3 ports are used to break the race condition and determine which gateway is to handle assignment of a firewall for inspection of the network traffic session (block 1416). When the receiving gateway is not to handle assignment of a firewall (e.g., the receiving gateway does not "win"), the receiving gateway determines whether a peer firewall is available (blocks 1418-1420). When a peer firewall is available, a forward session is created, if necessary, indicating that the peer gateway "wins" the right to create a session and the UDP packet is forwarded to the peer gateway (blocks 1422-1426), where determining whether the peer gateway "wins" is similar to the discussion of winning such a right above.

However, when a peer firewall is not available and a local firewall is not available, the packet is dropped (blocks 1428-1430). When a peer firewall is not available but a local firewall is now available, the receiving gateway searches the disk cache for the session (e.g., queries storage using the session hash to determine whether a local firewall previously inspected the network traffic session to which the TCP packet belongs (block blocks 1426, 1428 and 1432). When the session is not found on disk cache, the receiving gateway selects a local firewall via round-robin computation, a hash of the firewall session is generated (optionally, the forward session is converted to a firewall session) and logged to storage along with an indication of the selected local firewall (blocks 1434-1438). The UDP packet is then forwarded to the selected firewall (block 1440).

When searching of the disk cache returns a local firewall, the receiving gateway selects the relevant firewall (block 1442) and determines whether the selected firewall is available (block 1444). When the selected firewall is available, the method 1400 proceeds to block 1436. When the selected firewall is not available, the method 1400 proceeds to method 1434 to select an available via round-robin computation.

Returning to block 1412 and when a peer firewall is not available (meaning no race condition can exist), the receiving gateway "wins" the session creation, converts the forward session to a firewall session (block 1446) and the method 1400 proceeds to block 1432 discussed above. Additionally, when the session is a forward session and a local firewall is not available (blocks 1406 and 1410) and when the session lookup operation does not return a match (e.g., "fail"), the method proceeds to block 1420 as discussed above.

Referring to the origin of a packet, the following example is illustrative. Transit gateway A and transit gateway B are deployed in an active-active configuration and transit gateway A receives a packet (e.g., a UDP) from a spoke VPC, such as illustrated in FIG. 13. In summary, upon receipt of the packet by the transit gateway A, the transit gateway A is considered the "receiving gateway." Upon transmitted the packet to the transit gateway B, the transit gateway A is considered the "originating gateway" and the transit gateway B is now considered the "receiving gateway."

For example, briefly referring back to FIG. 13, assuming the transit gateway A receives a UDP packet from a spoke VPC (block 1302), the transit gateway A is considered the receiving gateway. When a session lookup operation fails (e.g., no session found) ("Fail" at block 1304), the transit gateway A creates a tentative forward session (block 1308) and forwards the received UDP packet to its peer, i.e., transit gateway B (block 1310). At this point, the transit gateway A is considered the originating gateway and the transit gateway B is considered the receiving gateway.

In the foregoing description, the invention is described with reference to specific exemplary embodiments thereof. It will, however, be evident that various modifications and changes may be made thereto without departing from the broader spirit and scope of the invention.

What is claimed is:

1. A computerized method for directing transmission of a data packet within a distributed cloud computing system, the computerized method comprising:
   receiving a data packet by a receiving gateway instance deployed within the distributed cloud computing system;
   connecting a spoke gateway to a transit gateway using a native virtual private cloud network (VPC) attachment, wherein the spoke gateway and the transit gateway are deployed within the distributed cloud computing system;
   when a session corresponding to the data packet is found via a session lookup, determining whether the session is a forwarding session-type and when the session is not the forwarding session-type, forwarding the data packet to a destination in accordance with the session lookup;

when the session is found and when the session is the forwarding session-type, invalidating the forwarding session and determining whether a peer firewall instance is available thereby indicating that a race condition exists;

when the race condition exists, determining whether the receiving gateway instance is also an originating gateway instance;

when the race condition exists and the receiving gateway instance is also the originating gateway instance, identifying the receiving gateway instance wins a right to establish a firewall session; and when the race condition exists and the receiving gateway instance is not the originating gateway instance, determining the receiving gateway instance wins a right to establish a firewall session.

2. The computerized method of claim 1, wherein the data packet is a Transmission Control Protocol (TCP) packet.

3. The computerized method of claim 1, wherein the data packet is received from a peer gateway within the distributed cloud computing system.

4. The computerized method of claim 3, wherein the receiving gateway instance and the peer gateway are deployed in an active-active configuration.

5. The computerized method of claim 1, further comprising:

when the race condition exists and the receiving gateway instance wins a right to establish a firewall session, establishing a firewall session;

when one or more local firewall instances are available, selecting a local firewall instance using a load-balancing technique; and forwarding the data packet to the selected local firewall instance.

6. The computerized method of claim 1, further comprising:

when the session is not found and one or more local firewall instances are available, selecting a local firewall instance using a load-balancing technique; and forwarding the data packet to the selected local firewall instance.

7. The computerized method of claim 1, wherein the distributed cloud computing system includes a controller configured to deploy a first gateway in a spoke virtual private cloud network (VPC) and the receiving gateway instance in a transit VPC, wherein the receiving gateway instance is configured to connect to one or more firewall instances deployed within the transit VPC, and wherein the spoke VPC and the transit VPC are both located within a cloud computing network, and logic, stored on non-transitory, computer-medium, that, upon execution by one or more processors, causes performance of operations including:

receiving network traffic transmitted between multiple gateways deployed within the distributed cloud computing system, providing the network traffic to a first firewall instance for inspection, and routing the network traffic to a destination VPC deployed within the cloud computing network.

8. The computerized method of claim 1, wherein a peer firewall is attached to a peer gateway and a local firewall is attached to the receiving gateway.

* * * * *